(12) United States Patent
Wei

(10) Patent No.: US 11,410,212 B2
(45) Date of Patent: Aug. 9, 2022

(54) SECURE IDENTITY VERIFICATION

(71) Applicant: Advanced New Technologies Co., Ltd., George Town (KY)

(72) Inventor: Yongdong Wei, Shanghai (CN)

(73) Assignee: Advanced New Technologies Co., Ltd., George Town (KY)

( * ) Notice: Subject to any disclaimer, the term of this patent is extended or adjusted under 35 U.S.C. 154(b) by 388 days.

(21) Appl. No.: 14/727,755

(22) Filed: Jun. 1, 2015

(65) Prior Publication Data

US 2015/0348027 A1     Dec. 3, 2015

(30) Foreign Application Priority Data

Jun. 3, 2014    (CN) .......................... 201410242475.1

(51) Int. Cl.
*G06Q 30/06*     (2012.01)
*G06Q 20/38*     (2012.01)
(Continued)

(52) U.S. Cl.
CPC ......... *G06Q 30/0601* (2013.01); *G06F 21/34* (2013.01); *G06Q 20/3829* (2013.01);
(Continued)

(58) Field of Classification Search
CPC ............... H04L 63/123; H04L 2209/56; H04L 2209/80; H04L 2209/805; H04L 63/083; H04L 63/0853; H04L 63/0861; H04L 63/126; H04L 63/1441; H04L 63/1483; H04L 9/0897; H04L 9/3226; H04L 9/3231; H04L 9/3234; H04L 9/3247; H04L 9/3263; G06F 21/6218; G06F 2221/2119; G06F 21/34; G06Q 20/341; G06Q 20/347; G06Q 20/3574; G06Q 20/367; G06Q 20/3821; G06Q 20/3829; G06Q 30/0601; G06Q 20/40; G06Q 20/405; G06Q 30/0609; G06Q 40/02; G06Q 50/28; G07F 7/10; G07F 7/1008; G07F 7/1066
(Continued)

(56) References Cited

U.S. PATENT DOCUMENTS 6,633,979 B1    10/2003  Smeets
7,333,611 B1     2/2008  Yuen et al.
(Continued)

FOREIGN PATENT DOCUMENTS

EP        2101276     9/2009
JP      2001216395    8/2001
(Continued)

*Primary Examiner* — Slade E Smith
(74) *Attorney, Agent, or Firm* — Van Pelt, Yi & James LLP

(57) ABSTRACT

Embodiments of the present application relate to a method, apparatus, and system for verifying an identity of a user. The method includes receiving a preset key that is associated with a key carrier that is a physical object, storing the preset key in a database storing mappings between a plurality of preset keys and a plurality of users, receiving a verification key in connection with an identity verification of a user, retrieving the preset key associated with the user from the database, determining whether the verification key matches the preset key associated with the user, and causing a determination of whether the key carrier is authentic.

29 Claims, 11 Drawing Sheets

(51) Int. Cl.
*G06F 21/34* (2013.01)
*G06Q 20/40* (2012.01)
*G06Q 40/02* (2012.01)
*G06Q 50/28* (2012.01)

(52) U.S. Cl.
CPC .......... *G06Q 20/40* (2013.01); *G06Q 20/405* (2013.01); *G06Q 30/0609* (2013.01); *G06Q 40/02* (2013.01); *G06Q 50/28* (2013.01)

(58) Field of Classification Search
USPC .......................................................... 705/50
See application file for complete search history.

(56) References Cited

U.S. PATENT DOCUMENTS

| | | | | |
|---|---|---|---|---|
| 8,438,385 B2* | 5/2013 | Song | ................ | H04L 9/3263 |
| | | | | 713/156 |
| 8,582,829 B2 | 11/2013 | Shuster | | |
| 9,118,666 B2* | 8/2015 | Naguib | ................ | H04L 9/3247 |
| 9,172,698 B1 | 10/2015 | Evans et al. | | |
| 2002/0049636 A1 | 4/2002 | Griffin et al. | | |
| 2002/0064279 A1* | 5/2002 | Uner | ................ | H04L 9/0662 |
| | | | | 380/44 |
| 2003/0074557 A1* | 4/2003 | Vatanen | .............. | G06F 21/6209 |
| | | | | 713/168 |
| 2003/0154405 A1* | 8/2003 | Harrison | ................ | H04L 63/083 |
| | | | | 726/9 |
| 2004/0010697 A1* | 1/2004 | White | ................ | G06F 21/31 |
| | | | | 713/186 |
| 2005/0033651 A1* | 2/2005 | Kogan | ................ | G06Q 30/0601 |
| | | | | 705/26.1 |
| 2007/0271602 A1* | 11/2007 | Harrison | ............. | H04L 63/0861 |
| | | | | 726/6 |
| 2008/0197972 A1* | 8/2008 | Lawson | ................ | G07D 7/0043 |
| | | | | 340/5.86 |
| 2009/0106551 A1 | 4/2009 | Boren et al. | | |
| 2009/0271633 A1* | 10/2009 | Cohen | ..................... | G06F 21/35 |
| | | | | 713/185 |
| 2010/0145867 A1* | 6/2010 | Fowkes | ................... | G06F 21/31 |
| | | | | 705/318 |
| 2013/0046985 A1* | 2/2013 | Allen | .................... | H04L 9/0825 |
| | | | | 713/171 |
| 2013/0227286 A1 | 8/2013 | Brisson | | |
| 2013/0238894 A1* | 9/2013 | Ferg | ........................ | H04L 9/321 |
| | | | | 713/155 |
| 2013/0347129 A1* | 12/2013 | Samuelsson | ........ | H04L 63/0838 |
| | | | | 726/28 |
| 2014/0082095 A1* | 3/2014 | Balinsky | ............... | G06Q 10/103 |
| | | | | 709/206 |
| 2014/0304183 A1 | 10/2014 | Zabar | | |
| 2015/0235235 A1* | 8/2015 | Koren | ................ | G06Q 30/0185 |
| | | | | 705/318 |
| 2016/0255078 A1* | 9/2016 | Zhang | ..................... | H04L 63/18 |
| | | | | 726/4 |

FOREIGN PATENT DOCUMENTS

| | | | | |
|---|---|---|---|---|
| JP | 2007257491 A | * 10/2007 | ............... | G07D 7/00 |
| JP | 2007257491 A | 10/2007 | | |
| JP | 2012113540 | 6/2012 | | |
| KR | 20090104638 | 10/2009 | | |

* cited by examiner

SECURE IDENTITY VERIFICATION

CROSS REFERENCE TO OTHER APPLICATIONS

This application claims priority to People's Republic of China Patent Application No. 201410242475.1 entitled A METHOD, A CLIENT, A SERVER SIDE AND A SYSTEM FOR VERIFYING IDENTITIES, filed Jun. 3, 2014 which is incorporated herein by reference for all purposes.

FIELD OF THE INVENTION

The present application relates to a field of information technology. In particular, the present application relates to secure verification of user identities.

BACKGROUND OF THE INVENTION

In recent years, with the rapid development of e-commerce, an increasing number of users purchase goods using online shopping. According to some related art, online shopping generally includes a user selecting merchandise or services on the Internet (e.g., an e-commerce website) and then, offline, obtaining the corresponding merchandise or services.

Users generally user the Internet to register accounts with virtual stores (e.g., e-commerce websites or e-commerce applications) set up by merchants, to select merchandise or services, and to issue shopping requests via electronic orders. Users can generally choose to complete payment online or offline. After merchants receive electronic orders, the merchants deliver merchandise or services to users by post or another form of physical delivery. Users can also acquire appropriate goods or receive appropriate services in ways specified by the merchants. For example, users can acquire the appropriate merchandise or services in physical brick-and-mortar stores designated by merchants.

Regardless of which method used for delivering or picking-up the purchased goods or services, merchants generally need to verify the identities of users so as to complete user identity confirmations. According to some related art, identity verification is carried out by using authentication keys shared between merchants and users. The use of authentication keys to verify an identity generally requires a merchant to generate a key online through an e-commerce platform server side. The merchant can randomly generate the key or can generate the key according to a predetermined rule. In the event that the key is generated, the server side may store the key. At the same time, the generated key can be sent to a user in some manner provided by the user such as via a communication number or an email address. The user provides the key to the merchant offline. In the event that the merchant receives the key from the user, the server side compares the provided key to the keys stored by the server side. If the server side is able to match the user-provided key with one of the keys stored by the server side, the user passes the identity verification. If the server side is unable to match the user-provided key with one of the keys stored by the server side, the user does not pass identity verification.

However, in the event that the merchant and the user used a shared authentication key to verify the identity of the user, a malicious party can acquire the user's key immediately upon stealing, copying, or intercepting the communication number or email address associated with the user or information such as a registered account with the merchant. Accordingly, when the merchant carries out identity verification offline, the malicious party can use the stolen key to pass the identity verification performed by the server side. The malicious party can thus take the place of the genuine user in order to acquire merchandise or enjoy the corresponding services, with the result that the genuine user suffers a loss. In such an approach, a malicious party can pass the identity verification by merely using a stolen user key. There is a relatively large security risk.

In summary, identity verification methods according to some related art can be circumvented by some malicious parties. Therefore, there is a need for a method, device, and system for providing more effective identity verification.

BRIEF DESCRIPTION OF THE DRAWINGS

Various embodiments of the invention are disclosed in the following detailed description and the accompanying drawings.

DETAILED DESCRIPTION

Figure 1A:
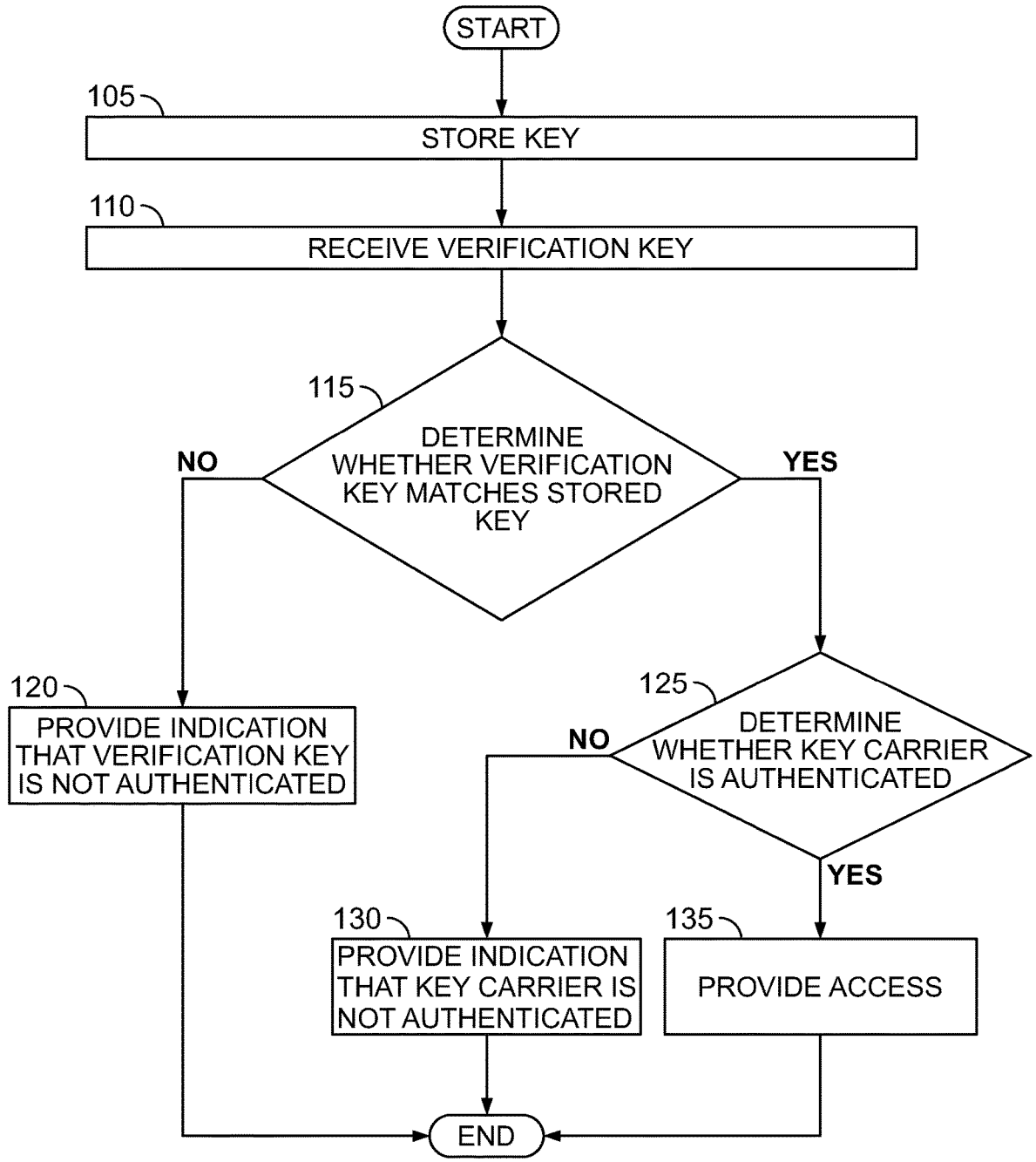
FIG. 1A is a flowchart of a method for identity verification according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method and a device (e.g., a terminal) for identity verification.

As used herein, the "identity verification" generally refers to the process of confirming identity information associated with a user in the event that the server component and the terminal (e.g., the client) are in different physical or logical locations.

In some embodiments, the "server component" corresponds to a server. As an example, the server can be configured as a Web server and used to acquire, store, or process user identity information. As another example, the server can be specifically configured for identity verification. The server can host an e-commerce website, or otherwise provide web services associated with e-commerce. For example, the server can provide web services to applications installed on various terminals. The server can be an authentication server associated with an e-commerce website or e-commerce site.

In some embodiments, the terminal, which can also be referred to as a client, acquires, stores, or processes verification information. The verification information can be input to the terminal by a user.

The terminal and server component can communicate with each other over a network such as the Internet. As an example, the terminal and server component can communicate with each other using protocols such as HTTP, TCP/IP, or the like.

FIG. 1A is a flowchart of a process for identity verification according to various embodiments of the present application.

Referring to FIG. 1A, a process 100 for identity verification is provided. In some embodiments, process 100 is implemented by a server. For example, process 100 can be implemented by server 300 of FIG. 3 or server 400 of FIG. 4. Process 100 can be implemented by the system 800 of FIG. 8.

At 105, a preset key is stored. In some embodiments, the server component stores the preset key. The server component can store the preset key at a local or a remote storage. In some embodiments, the server component generates the key. For example, the key can be generated in connection with registration of a user with a web-service (e.g., an e-commerce website associated with the server component). In some embodiments, the server component receives the key. The server can store the key in a database comprising a plurality of preset keys. The database further stores mappings between preset keys and users (e.g., user identifiers). The preset key can be an alphanumeric string. In some embodiments, the preset key includes special characters. As will be explained in greater detail below, the preset key is used to verify the user.

In some embodiments, the key stored by the server can be defined by a user. For example, a user can input a self-defined preset key at the server component. The user can input the self-defined preset key using an interface provided by the terminal in connection with the web service or the like provided by the server component. As an example, the user can input the self-defined preset key in connection with (e.g., during) registration of the user with a web-service (e.g., an e-commerce website associated with the server component). In the event that the user inputs the self-defined preset key, the server component can receive and store the preset key.

In some embodiments, the preset key can be based at least in part on a characteristic or property of a key carrier or the terminal. As used herein, a key carrier refers to a physical object on which a unique identifier is embedded. Generally the unique identifier should be human readable or easily decodable (e.g., using a handheld device such as a mobile phone). The unique identifier can be a serial number printed on a banknote, or an International Mobile Equipment Identification Number (IMEI) binded to a mobile phone. For example, the key can be generated using a characteristic or property of the key carrier or the terminal. The characteristic or property used to generate the key can be a unique identifier of the key carrier or the terminal. As an example, the self-defined preset key input by the user can be a characteristic number or alphanumerical value of the key carrier.

In some embodiments, for key carriers of the same type, a preset key has a unique corresponding key carrier. As an example, a banknote serial number (also referred to as a currency number) on some national currency can correspond to the preset key. In such an example, the key carrier corresponds to an item corresponding to a representation of a currency (e.g., a banknote) that bears a unique identification such as a serial number (e.g., an alphanumerical string). In some embodiments, the banknote serial number of a particular national currency serves as the preset key. For example, a renminbi banknote serial number may serve as the preset key. The renminbi described here refers to the legal money issued by the People's Republic of China. In the present embodiment, the renminbi banknote serial number primarily refers to the serial number on a paper renminbi banknote. The banknote serial number can include two English letters and eight Arabic numerals (e.g., SF12345678). As another example, an IMEI number can be used as a preset key. In such an example, the key carrier corresponds to a device (e.g., the terminal) that bears the IMEI number.

In some embodiments, the key carrier described above generally may be a physical carrier that records the preset key. For example, the physical carrier can be a physical object of a specific material or form. As another example, the physical carrier can be a physical object that uniquely includes the preset key and that is difficult to acquire or duplicate. An example would be the renminbi banknote serial number or the International Mobile Equipment Identification Number described above.

In many countries, the serial numbers of banknotes of the same denomination and the same issue are unique. For example, in China, the banknote serial numbers of renminbi of the same denomination and the same issue are unique. For such a banknote serial number, there is only one piece of actual currency (e.g., a single authentic one hundred-yuan bill with the serial number of SF123435678) that corresponds to the currency number. Various embodiments use the uniqueness of renminbi currency numbers or the like as the preset keys. For example, a preset key may be a banknote serial number (also referred to as a national currency number). Specifically, the banknote serial number used as a preset key can be a banknote serial number on Chinese currency, or a banknote serial number of approved currency from another country.

The user can input the preset key to a server component. Accordingly, in the event that the user inputs the preset key to the server component, the server component can receive and store the preset key. In some embodiments, the server component includes a module configured on a web server. In some embodiments, the server component includes a module partitioned from another server for the purpose of implementing appropriate functions. In some embodiments, the server component is a module that is specifically set up to implement the appropriate functions. The server component can be provided with an operating interface through which the user can input the preset key. As an example, the interface through which the user can input the preset key can be a website hosted by, or otherwise associated with the server component. As an example, the interface through which the user can input the preset key can be a format through which an application installed on the terminal communicates with the server component in order to communicate the preset key that is input to the user at the terminal. In a specific example, at the user interface provided by the server component (e.g., on an application executing on the terminal), User A can input a preset key for which the corresponding renminbi banknote serial number is SF12345678. The server component can receive and store the preset key whose banknote serial number is SF12345678.

The user inputs the preset key. In response to the user submitting the preset key, the terminal communicates the preset key to the server component, and the server component can receive and store the preset key input by the user.

In some embodiments, the server checks the preset key in its database to determine whether the preset key already exists in the database. In some embodiments, if the same preset key already exists in the database and corresponds to a different user, the current user is asked to enter a different preset key to ensure uniqueness. In some embodiments, the database can store multiple associations of the preset key. For example, the preset key can be associated with different users (e.g., for different applications, or different registrations). For example, if the preset key corresponds to a serial number on a banknote, the banknote can be transferred between different users, and the various different users can use the banknote as a key carrier during the time that the user is in possession of the banknote.

At 110, a verification key is received. In some embodiments, the verification key is received by the server component. The server component can receive the verification key from the terminal. For example, in response to receiving a verification key input by the user via an application executing on the terminal, the terminal sends the verification key to the server component.

The verification key can correspond to a key that a user uses in connection with authentication of the terminal. In some embodiments, a verification key submitted by the user must be authenticated before the server component verifies the identity of the user.

The user can input a verification key at the terminal. In some embodiments, the terminal executes an application (e.g., a browser-based application or a standalone application) and provides (e.g., displays) an interface by which the user can submit the verification key to the terminal. The user can input the verification key in connection with a request to access the server component. For example, the user can be prompted to submit the verification key in connection with an authentication procedure of the user. As an example, the server component can prompt for the verification key (e.g., send a web page with a prompt for the user to submit the verification key). In some embodiments, an application stored on the terminal includes an interface in which the user can input (and submit) the verification key. The terminal can receive the verification key input by the user and send the verification key to the server component. For example, User A can input the verification key SF12345678 or the verification key SK12345678 to the terminal. The terminal can receive the verification key input by the user and send the verification key input by the user to the server component. The terminal can send the verification key input by the user contemporaneously with the input of the verification key to the terminal by the user.

At 115, it is determined whether the verification key matches the stored preset key. In some embodiments, the server component determines whether the verification key submitted by the user (e.g., in connection with authentication of the user) matches the stored key (e.g., the key stored at 105). In response to the server component receiving the verification key from the terminal (e.g., in connection with authentication of the user), the server component compares the verification key with the stored preset key to determine whether the verification key (submitted by the user at 110) matches the stored preset key (stored at 105). In response to comparing the verification key with the stored preset key, the server component can send a result of the key comparison to the terminal.

The server component can receive the verification key sent by the terminal. In response to receiving the verification key, the server component can compare the verification key input by the user with the preset key stored by the server component and determine whether the verification key and the preset key match (e.g., are the same). The server component can store preset keys for multiple users. For example, the server component can store a plurality of preset keys each of which is respectively associated with a user registered with the server component.

In some embodiments, the server component compares the verification key input by the user with the stored preset keys to determine whether the verification key matches the stored preset key (the server component can compare the verification key input by the user to each of the stored preset keys). If, during the process of individually comparing the verification key input by the user to each of the stored preset keys, the server component has stored a preset key that matches the verification key, then the result of the key comparison is that the verification key matches the stored preset key. In some embodiments, the verification key can be submitted without an association to any particular user such that the server component can compare the verification key to all stored preset keys to determine whether the verification key matches any of the stored preset keys.

In some embodiments, the verification key can be submitted with an association to a particular user (e.g., in connection with submission of a user identifier). In response that the verification key is submitted in association with a particular user, the server component can compare the verification key submitted by the user with the stored preset key corresponding to the user. The result of the key comparison is the result according to the comparison between the verification key and the stored preset key corresponding to the particular user (e.g., regardless of whether a preset stored key corresponding to another user matches the verification key).

The server component can send the result of the key comparison result to the terminal.

In the event that the verification key is deemed to not match the stored preset key at 115, then at 120, an indication can be provided that indicates that the verification key does not match the stored preset key. For example, the server component can provide an indication to the terminal that the verification key submitted to the user is not authenticated. For example, if the server component has not stored a preset key that is the same as the verification key, then the result of the key comparison result is that the verification key is different from the stored preset key (or all of the preset keys in the event that the verification key submitted by the user is compared to all of the stored preset keys).

In a specific example, User A inputs a national banknote serial number as a preset key to the terminal. The terminal communicates the national banknote serial number to the server component. The server component receives and stores the banknote serial number of the national currency. The server component stores the banknote serial number of the national currency as a preset key. To access the server component, the User A inputs a verification key to an application executing on the terminal. The terminal sends the verification key to the server component. The server component receives a verification key sent by the terminal. For example, if the verification key input by the User A corresponds to SF12345678, the server component receives the verification key SF12345678 input by User A and sent by the terminal. The server component can compare the verification key to the stored banknote serial number to determine whether the verification key and the stored banknote serial number match. The server component compares the verification key SF12345678 to the stored national banknote serial number SF12345678 that was input by User A. If the verification key and the banknote serial number match (e.g., are the same), the result of the key comparison result indicates that the verification key and the stored banknote serial number are the same. If the verification key and the banknote serial number do not match (e.g., are not the same), the result of the key comparison result indicates that the verification key and the stored banknote serial number are different. The server component can send the result of the key comparison result of the comparison of the verification key to the stored banknote serial number to the terminal.

In another example, the verification key input by the user and received by the server component is SF12345678. In this example, the server component has stored multiple preset keys. For example, the stored preset keys stored by the server component are SF12345677, SF12345678 and SF12345679. The server component compares the verification key SF12345678 to each of the stored preset keys and determines that among the multiple stored preset keys SF12345677, SF12345678 and SF12345679 is a preset key that matches (e.g., is the same as) the verification key SF12345678. Accordingly, the result of the key comparison result is deemed to be that the verification key matches (e.g., is the same) the preset key. The server component sends the result of the key comparison to the terminal.

In the event that the verification key is deemed to match the stored preset key at 115, at 125, an authentication of the key carrier is caused to be performed. In some embodiments, the server causes programs or code executing on itself to authenticate (e.g., verify) the key carrier corresponding to the verification key. For example, if the key carrier has communication capabilities, the server can determine whether the key carrier is valid or whether the key carrier includes the verification key received at 110 by invoking an authentication function and communicating with the key carrier directly using a preconfigured protocol. In some embodiments, the server causes another device (such as a bill detector device) to verify whether the key carrier is true and valid. In some embodiments, the result of the verification is communicated to the server to update records. For example, in some embodiments, the verification of the key carrier is performed at a client side and the result of the verification of the key carrier is communicated to the server. The server can determine whether the key carrier is verified according to the result communicated to the server by the client side.

If the key carrier is an electronic device (e.g., the terminal), the server can communicate with the key carrier (e.g., using a predefined protocol) in order to authenticate the key carrier. For example, the server can request information associated with the verification key from the terminal. As an example, if the verification key corresponds to a Media Access Control (MAC) address of the terminal, then the server can obtain the MAC address of the terminal and compare the obtained MAC address to the verification key received at 105. As an example, the server can obtain the MAC address from a header of a message received from the terminal (e.g., the message that included the preset key received and stored at 110, the message that included the verification key received at 110, or the like). As another example, the server can send a request for the MAC address of the terminal to the terminal. In response to the request for the MAC address of the terminal, the terminal can send a message that includes the MAC address of the terminal. According to various embodiments, other unique identifiers associated with the terminal can be used as the verification key and the server can authenticate the key carrier (e.g., the terminal) using a method similar to the method described above in relation to verifying the MAC address of the terminal.

In some embodiments, in the event that the key carrier is an electronic device that is not the terminal with which the user submits the preset key or verification key, the server can directly (e.g., without the terminal acting as an intermediary between the server and the key carrier) verify the key carrier. The server can also indirectly communicate (e.g., using the terminal as an intermediary between the server and the key carrier) to verify the key carrier.

In some embodiments, in the event that the result of the key comparison between the verification key and the preset key indicates that the verification key and the preset key match, the key carrier of the verification key provided by the user is verified to determine whether the key carrier is true and valid. The key carrier for said verification key can be a physical carrier bearing the verification key provided by the user. If said key carrier is true and valid, then identity verification can be passed. If said key carrier is not true and valid, then identity verification can be failed.

In the event that the key carrier is not authenticated at 125 (e.g., if the key carrier is deemed to be not valid), at 130, an indication is provided that the key carrier is not authenticated. For example, the server can send to the terminal an indication that the key carrier is not authenticated.

In the event that the key carrier is authenticated at 125 (e.g., if the key carrier is deemed to be valid), at 135, access is provided. The server can provide access or otherwise provide an indication that the key carrier is authenticated to the user or the terminal. If the key carrier is authenticated at 125, then the user is deemed to have passed the identity verification. The server can provide access to a service or the like in the event that the user is deemed to pass the identity verification.

The server can determine whether the key carrier is authenticated according to information received by the terminal. For example, the terminal can provide an indication whether the key carrier is valid (e.g., a vendor representative can analyze the key carrier and input to the terminal whether the key carrier is valid).

For example, User A buys a movie ticket at an e-commerce website of Merchant B's (or using an application installed on the user's terminal). The user can configure the preset key to correspond to a renminbi banknote serial number of SF12345678. For example, the user can register the preset key with the Merchant B's server component. The server component can receive the preset key SF12345678 input by User A and store the preset key. In connection with the identity verification of the user (e.g., if the user is picking up the movie tickets at the theatre or attempting to gain entry at the movie theatre), User A can enter the verification key SF12345678 via a user interface at a client of the offline movie theater designated by the merchant. The client can receive the verification key SF12345678 from User A and send the verification key SF12345678 to the server component. The server component receives the verification key SF12345678 sent by the client and compares the verification key to the stored preset key SF12345678. If the verification key SF12345678 and the preset key SF12345678 match, the result of the key comparison is that the verification key and the preset key are the same. In response to determining whether the verification key and the preset key match, the server component sends the result of the key comparison to the client. The client receives the result of the key comparison from the server component. If the verification key matches the preset key, User A provides the renminbi matching the verification key (e.g., the renminbi whose currency number is SF12345678). Preferably, a banknote authentication device capable of detecting the physical properties of the banknote and determining its authenticity (e.g., a banknote counter or bill detector with ultraviolet, magnetic, or other appropriate detection technology) verifies the genuineness of the renminbi whose banknote serial number is SF12345678. In the event that the renminbi whose banknote serial number is SF12345678 is deemed genuine rather than counterfeit, User A is deemed to pass the identity verification. In the event that User A is deemed to pass the identity verification, Merchant B can provide the appropriate merchandise or services to User A. For example, Merchant B can provide User A with the movie ticket and/or admit User A into the theater, allow User A to pick up some prepaid merchandise, etc.

Figure 1B:
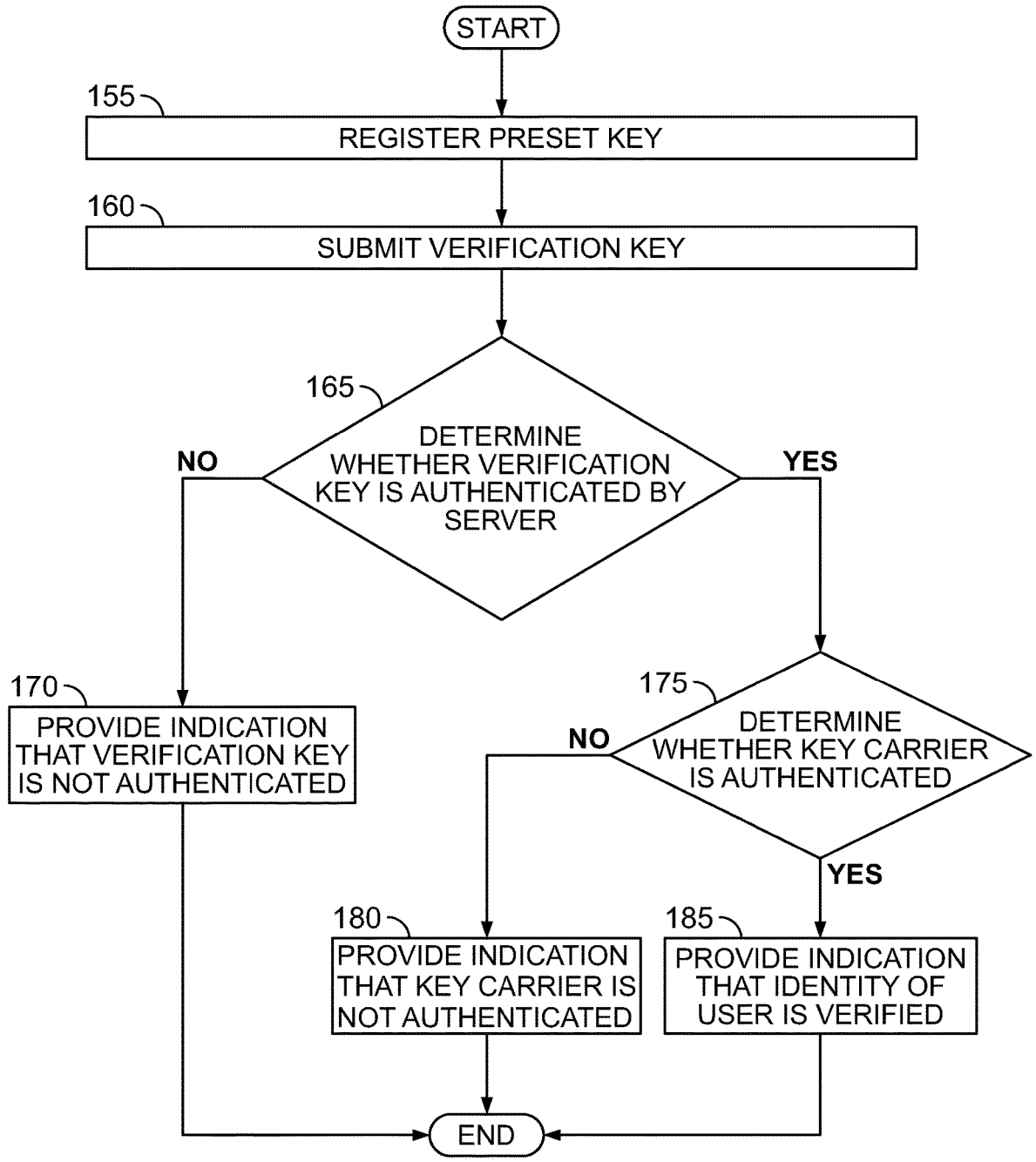
FIG. 1B is a flowchart of a method for identity verification according to various embodiments of the present application.

FIG. 1B is a flowchart of a method for identity verification according to various embodiments of the present application.

Referring to FIG. 1B, a method 150 for identity verification is provided. In some embodiments, process 150 is implemented by a terminal. For example, the process 150 can be implemented by terminal 500 of FIG. 5 or terminal 600 of FIG. 6. The process 150 can be implemented by the system 800 of FIG. 8.

At 155, a preset key is registered. In some embodiments, a user registers a preset key with a server. For example, the user can input the preset key to a terminal that communicates the preset key to the server. The terminal with which the user registers the preset key can correspond to a user-owned terminal or the like. In response to receiving the preset key from the terminal, the server stores the preset key. The server can store the preset key in association with the user (e.g., the preset key can be mapped to a user identifier of the user).

At 160, a verification key is submitted. In some embodiments, a user can submit a verification key. The user can submit the verification key in connection with an authentication procedure (e.g., an identity verification procedure). The verification key can be submitted via a terminal. In some embodiments, the terminal can be a client side terminal of a vendor performing the identity verification. For example, the terminal can be a terminal associated with a vendor that is also associated with the server. In some embodiments, the terminal can correspond to a user-owned terminal. The verification key can be submitted by a user via an interface displayed by the terminal. In response to receiving an input associated with the verification key, the terminal sends the verification key to a corresponding server for validation or authentication of the verification key. For example, the server compares the received verification key to the registered preset key.

At 165, a determination is made as to whether the verification key is authenticated. The verification key can be authenticated in relation to one or more stored preset keys. As an example, the server can authenticate the verification key according to a stored preset key associated with the user (e.g., the preset key registered at 155). As another example, the server can authenticate the verification key according to all stored preset keys (e.g., regardless of the user that registered a particular preset key). The server can send a result of the authentication of the verification key (e.g., a result of the key comparison) to the terminal. For example, the server can indicate to the terminal whether the verification key is authenticated. The terminal can use the result of the authentication of the verification key (e.g., the indication of whether the verification key is authenticated) to determine whether the verification key is authenticated.

In the event that the terminal determines that the verification key is not authenticated at 165, then at 170, the terminal can provide an indication that the verification key is not authenticated. For example, the terminal can display the indication that the verification key is not authenticated. The identity verification process 150 can end in the event that the terminal determines that the verification key is not authenticated.

In the event that the terminal determines that the verification is authenticated at 165, then at 175, a determination can be made as to whether the key carrier is authenticated. The key carrier can correspond to a media from which the preset key registered at 155 is obtained.

The terminal can prompt the user or vendor representative (e.g., associated with a vendor corresponding to the server storing the preset key) to authenticate the key carrier. For example, the terminal can display a dialog box or other indication to prompt the user or vendor representative to confirm the authenticity of the key carrier. As an example, in the event that the user or a vendor representative determines that the key carrier is authentic, the user can confirm the authenticity of the key carrier by submitting a predefined input to the terminal. In the event that the user or vendor representative determines that the key carrier is not authentic, the user or vendor representative can provide an indication to the terminal that the key carrier is not authentic. For example, the user or vendor representative can submit a predefined input to the terminal (e.g., on a user interface) indicating that the key carrier is not authentic.

The terminal or vendor representative can determine that the key carrier is authentic by confirming that the key carrier includes the verification key that was submitted in connection with authentication of the verification key (e.g., the verification key submitted at 160). For example, the vendor representative can put the key carrier (e.g., a banknote) through a banknote counter which checks the banknote and confirms that the key carrier includes the verification key or that the key carrier is not counterfeit. As an alternative, the vendor representative can also manually verify the banknote by visually examining the watermark, paper, and/or other authentication properties associated with the banknote.

In the event that the terminal determines that the key carrier is not authenticated at 175, then at 180, an indication can be provided that the key carrier is not authenticated. For example, the terminal can display an indication on a user interface that the key carrier is not authenticated. The identity verification process 150 can end in the event that the terminal determines that the key carrier is not authenticated.

In the event that the terminal determines that the key carrier is authenticated at 175, then at 185, an indication can be provided that the key carrier is authenticated. In some embodiments, in the event that the key carrier is authenticated, the terminal can provide an indication that the identity of the user is verified. In some embodiments, the terminal can send an indication that the identity of the user is verified to the server. In response to receiving the indication that the identity of the user is verified, the server can provide the user with access to a service. In some embodiments, the terminal can display the indication that the identity of the user is verified. In response, a vendor representative can provide the user with admission to a venue, a product for pick up by the user, or the like in connection with the identity verification procedure.

In the event that the preset key is a banknote serial number of some national currency, the key carrier corresponds to the national currency that includes the banknote serial number. In the event that the preset key is a banknote serial number and the key carrier corresponds to a national currency (e.g., a dollar bill), the authentication of the key carrier includes verifying whether the national currency is genuine or counterfeit. If the verified national currency is genuine money, the key carrier is deemed to be authenticated (e.g., the key carrier is deemed true and valid). Conversely, if the key carrier corresponds to (e.g., is deemed to be) counterfeit money, then the key carrier is deemed to not be authenticated (e.g., is deemed to not be true and valid).

In some embodiments, the terminal is used to authenticate (e.g., verify) the key carrier of the verification key. The terminal can be configured to authenticate the key carrier. For example, the terminal can use a verification device which is specifically configured to verify the key carrier (e.g., the verification key included with the key carrier). In some embodiments, the terminal can execute an application or code installed on the terminal that authenticates the key carrier. For example, in the event that the key carrier is a national currency (e.g., a renminbi or a dollar bill), a bill detector configured to authenticate currency (e.g., determine whether renminbi is genuine or counterfeit) can be used to authenticate the key carrier. The bill detector can be an application or code installed on the terminal and can use a camera to capture an image of the key carrier and subsequently perform image analysis on the key carrier. In a specific example, User A registers a preset key whose renminbi banknote serial number is SF12345678 with the server component. The user, in addition to providing the verification key SF12345678, can provide a renminbi corresponding to the verification key SF12345678 (e.g., the bill that includes the key carrier), and a bill detector is used to verify whether said renminbi is genuine or counterfeit. If the renminbi is determined to be genuine money by the terminal, then the renminbi can pass verification.

In some embodiments, a manual approach of authenticating the key carrier corresponding to the verification key is used. For example, a manual approach can be used to identify characteristic information on the renminbi and to determine whether the renminbi is genuine or counterfeit. The manual approach can include a user or other person manually analyzing the key carrier to determine the authenticity thereof. The user or other person that performs the authentication of the key carrier can provide an input or other indication to the terminal that the key carrier is authenticated.

In an example of an implementation of a method for verifying an identity of a user, a user can purchase a movie ticket online and use a client terminal located at the movie theater.

For example, User A buys a movie ticket at an e-commerce website of Merchant B's (or using an application installed on the user's terminal). The user can configure the preset key to correspond to a renminbi banknote serial number of SF12345678. For example, the user can register the preset key with the Merchant B's server component. The server component can receive the preset key SF12345678 input by User A and store the preset key. In connection with the identity verification of the user (e.g., if the user is picking up the movie ticket at the theatre or attempting to gain entry at the movie theatre), User A can enter the verification key SF12345678 via a user interface at a client of the offline movie theater designated by the merchant. The client can receive the verification key SF12345678 from User A and send the verification key SF12345678 to the server component. The server component receives the verification key SF12345678 sent by the client and compares the verification key to the stored preset key SF12345678. If the verification key SF12345678 and the preset key SF12345678 match, the result of the key comparison is that the verification key and the preset key are the same. In response to determining whether the verification key and the preset key match, the server component sends the result of the key comparison to the client. The client receives the result of the key comparison from the server component. If the verification key matches the preset key, User A provides the renminbi matching the verification key (e.g., the renminbi whose banknote serial number is SF12345678). The genuineness of the renminbi whose banknote serial number is SF12345678 is verified. In the event that the renminbi whose banknote serial number is SF12345678 is deemed genuine (e.g., by the client), User A is deemed to pass the identity verification. In the event that User A is deemed to pass the identity verification, Merchant B can provide the appropriate merchandise or services to User A. For example, Merchant B can provide User A with the movie ticket.

In contrast to the method of conducting identity verification which is done solely through a shared key according to some related art, various embodiments described herein for an identity verification prevent a malicious party from stealing a digital key from a legitimate user and using solely the stolen key to gain access to goods and services to which the legitimate user is entitled. Accordingly, the security and reliability of verification are improved. In some embodiments, the banknote serial number of national currency (e.g., the renminbi banknote serial number) serves as the preset key for identity verification. Because national currency itself is in circulation, in implementations of various embodiments, users are not required to provide merchants with personal pass codes, email addresses, or other such personal information when the banknote serial number of some national currency or another appropriate key carrier is used as a key to perform identity verification. For users who place special emphasis on personal privacy, the identity verification approach is more acceptable.

Figure 2A:
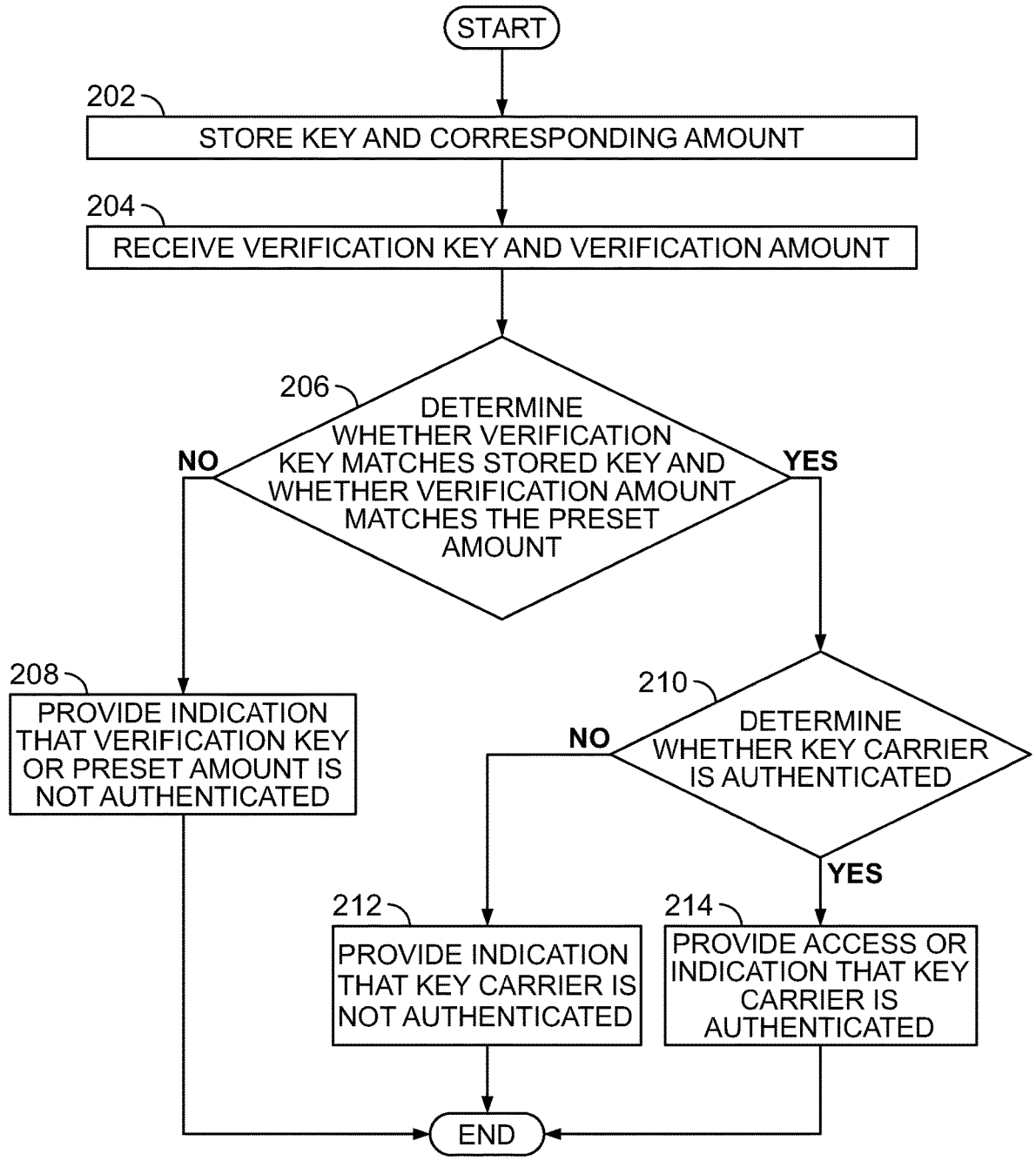
FIG. 2A is a flowchart of a method for identity verification according to various embodiments of the present application.

FIG. 2A is a flowchart of a method for identity verification according to various embodiments of the present application.

Referring to FIG. 2A, a method 200 for identity verification is provided. In some embodiments, process 200 is implemented by a server. For example, process 200 can be implemented by server 300 of FIG. 3 or server 400 of FIG. 4. Process 200 can be implemented by the system 800 of FIG. 8.

The server component can also receive and store additional information associated with the key carrier, such as a monetary amount (e.g., also referred to herein as a preset amount) that corresponds to the banknote serial number and that was input by a user. The terminal can receive a verification amount input by the user and send the verification amount to the server component. In some embodiments, the server also compares the verification amount with the preset amount to determine whether the verification amount is the same as the preset amount. Thereafter, the server can send the result of the comparison between the verification amount and the preset amount to a client. In response to receiving the result of the comparison between the verification amount and the preset amount, the client uses the result as a basis for determining whether an identity verification succeeds. For example, if the result of the comparison between the verification amount and the preset amount indicates that the amounts are different, then identity verification can be deemed to fail. Conversely, if the result of the comparison between the verification amount and the preset amount indicates that the amounts are the same, then identity verification can be deemed to succeed.

At 202, a key and corresponding amount are stored. The server stores the key (also referred to herein as a preset key) and a corresponding amount (also referred to herein as a preset stored amount). The server can receive the preset key and the preset amount from the user. For example, the server can receive the preset key and the preset amount during a registration of a user with the server, or in connection with a transaction between the user and the server (e.g., a purchase by the user of a good or service provided by the server). The server can store the preset key and the preset amount in a database comprising a plurality of corresponding preset keys and preset amounts. The database stores mappings between preset keys, preset amounts, and users (e.g., user identifiers). In some embodiments, the preset key and preset amount stored by the server can be defined by a user. For example, a user can input a self-defined preset key at the server component.

At 204, a verification key and verification amount are received. The server can receive the verification key and verification amount in connection with an identity verification of a user. In some embodiments, the server receives the verification key and the verification amount contemporaneously. Alternatively, in some embodiments, the server receives the verification amount after the verification key has been authenticated (e.g., if the verification key is successfully validated against the preset key). The server can receive the verification key and verification amount from a terminal. In some embodiments, the terminal can be a client side terminal of a vendor performing the identity verification. For example, the terminal can be a terminal associated with a vendor that is also associated with the server.

At 206, it is determined whether the verification key matches the stored preset key and whether the verification amount matches the preset amount. The server determines whether the verification key (submitted by the user in connection with an identity verification process) matches the preset key corresponding to the user and whether the verification amount (submitted by the user in connection with an identity verification process) matches the preset key corresponding to the user. The server can receive a user identifier associated with the user such that the user can search a database storing mappings between preset keys, preset amounts, and users for a preset key and preset amount respectively corresponding to the user.

In response to comparing the verification key with the stored preset key and comparing the verification amount with the preset amount, the server sends a result of the key and amount comparison to the terminal (e.g., the terminal from which the verification key is received).

In the event that the verification key is deemed to not match the stored preset key or the verification amount is deemed to not match the preset amount at 206, at 208, an indication can be provided that indicates that the verification key does not match the stored preset key and/or the verification amount does not match the preset amount. For example, the server can provide an indication to the terminal that the verification key submitted to the server is not authenticated or that the verification amount submitted to the server is not authenticated.

In the event that the verification key is deemed to match the stored preset key and the verification amount is deemed to match the preset amount at 206, at 210, authentication of the key carrier is caused to be performed. In some embodiments, the server causes programs or code executing on itself to authenticate (e.g., verify) the key carrier corresponding to the verification key. For example, if the key carrier has communication capabilities, the server can determine whether the key carrier is valid or whether the key carrier includes the verification key received at 204 by invoking an authentication function and communicating with the key carrier directly using a preconfigured protocol. In some embodiments, the server causes another device (such as a bill detector device) to verify whether the key carrier is true and valid. In some embodiments, the result of the verification is communicated to the server to update records. For example, in some embodiments, the verification of the key carrier is performed at a client side and the result of the verification of the key carrier is communicated to the server. The server can determine whether the key carrier is verified according to the result communicated to the server by the client side. The key carrier can be authenticated in a similar manner to authentication of the key carrier at 125 of FIG. 1A.

The server can determine whether the key carrier is authenticated according to information received by the terminal. For example, the terminal can provide an indication as to whether the key carrier is valid (e.g., a vendor representative can analyze the key carrier and input to the terminal whether the key carrier is valid).

The terminal can prompt the user or vendor representative (e.g., associated with a vendor corresponding to the server storing the preset key) to manually authenticate the key carrier. For example, the terminal can display a dialog box or other indication to prompt the user or vendor representative to confirm the authenticity of the key carrier. As an example, in the event that the user or a vendor representative determines that the key carrier is authentic, the user can confirm the authenticity of the key carrier by submitting a predefined input to the terminal. In the event that the user or vendor representative determines that the key carrier is not authentic, the user or vendor representative can provide an indication to the terminal that the key carrier is not authentic. For example, the user or vendor representative can submit a predefined input to the terminal (e.g., on a user interface) indicating that the key carrier is not authentic. The terminal can send to the server an indication of whether the key carrier is authenticated.

The terminal or vendor representative can determine that the key carrier is authentic by confirming that the key carrier includes the verification key that was submitted in connection with authentication of the verification key (e.g., the verification key submitted at 204). For example, the vendor representative can manually confirm that the key carrier includes the verification key or that the key carrier is not counterfeit.

In the event that the terminal determines that the key carrier is not authenticated at 210, at 212, an indication can be provided that the key carrier is not authenticated. The server can send an indication that the identity of the user is not verified (e.g., the user fails the identity verification). For example, the terminal can display an indication on a user interface that the key carrier is not authenticated or that the identity of the user is not verified. The identity verification process 200 can end in the event that the terminal determines that the key carrier is not authenticated.

In the event that the terminal determines that the key carrier is authenticated at 210, then at 214, an indication can be provided that the key carrier is authenticated. In response to receiving an indication that the key carrier is authenticated from the terminal, the server can send to the terminal an indication that the identity of the user is verified (e.g., the user passes the identity verification). In some embodiments, in the event that the key carrier is authenticated, the terminal can provide an indication that the identity of the user is verified. In some embodiments, the terminal can send an indication that the identity of the user is verified to the server. In response to receiving the indication that the identity of the user is verified, the server can provide the user with access to a service. In some embodiments, the terminal can display the indication that the identity of the user is verified. In response, a vendor representative can provide the user with admission to a venue, a product for pick up by the user, or the like in connection with the identity verification procedure.

As mentioned above, in China, the banknote serial numbers of renminbi of the same denomination and the same issue are unique. For such a banknote serial number, only one piece of genuine currency bears (and corresponds to) the banknote serial number. For more convenient and accurate identity verification, a user can, while inputting a banknote serial number, also input the monetary amount corresponding to the banknote serial number. For example, User A inputs the banknote serial number SF12345678 at the server component and also inputs the amount 100 yuan, which corresponds to the banknote serial number SF12345678. User A inputs the verification key SF12345678 at the client and, at the same time, inputs the verification amount 50 yuan. The client sends the verification amount 50 yuan to the server component. After the server component receives the verification amount, the server compares the verification amount with the preset stored amount. In this example, the server component determines that the verification amount and the preset stored amount are different. The verification amount 50 yuan is different from the preset stored amount 100 yuan. The server component sends the result of the comparison to the client. In the event that the result of the comparison between the verification amount and the preset stored amount indicates that the amounts are different, User A's identity verification fails.

Figure 2B:
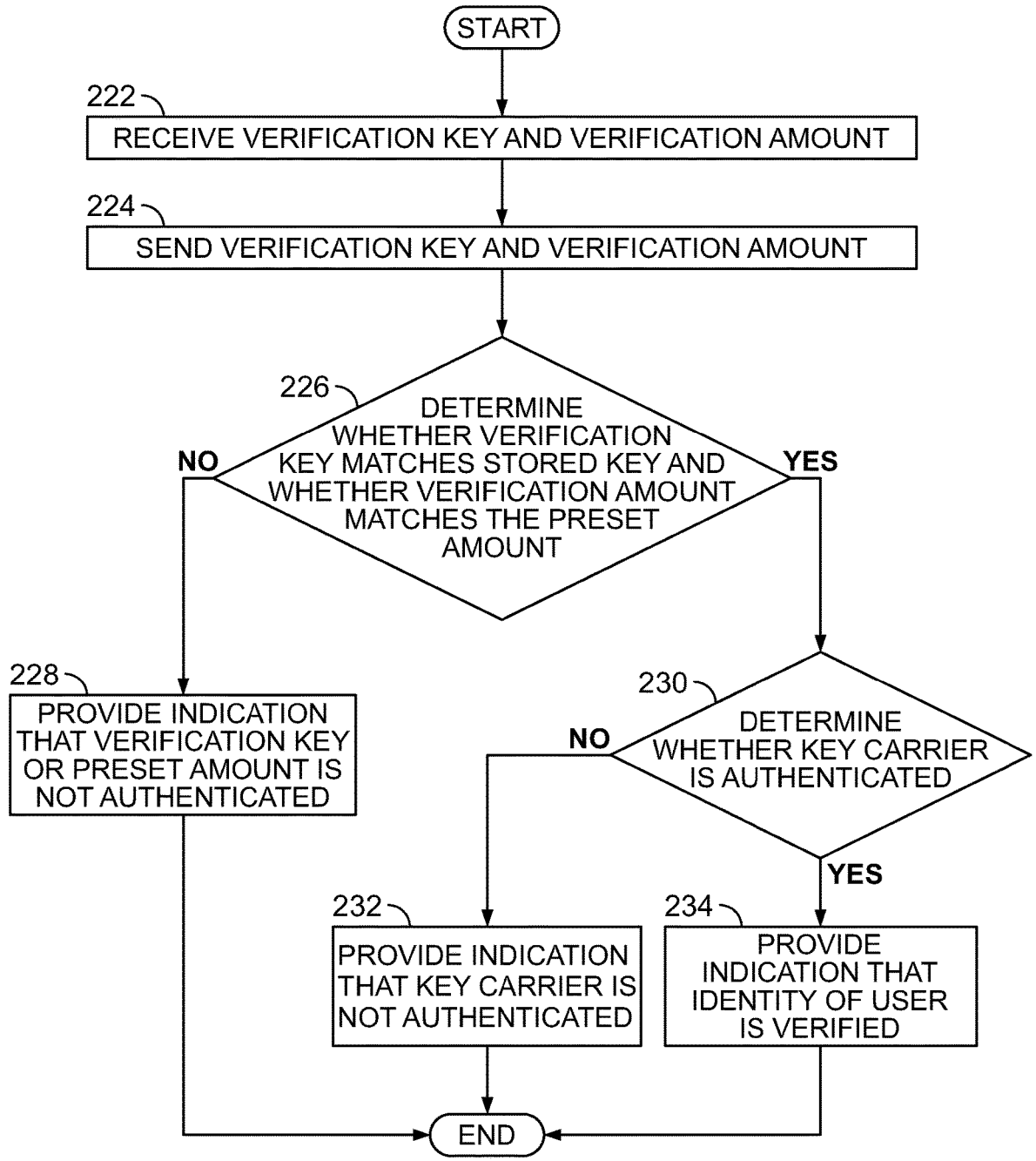
FIG. 2B is a flowchart of a method for identity verification according to various embodiments of the present application.

FIG. 2B is a flowchart of a method for identity verification according to various embodiments of the present application.

Referring to FIG. 2B, a process 220 for identity verification is provided. In some embodiments, process 220 is implemented by a terminal. For example, process 220 can be implemented by terminal 500 of FIG. 5 or terminal 600 of FIG. 6. Process 220 can be implemented by the system 800 of FIG. 8.

At 222, a verification key and verification amount are received. In some embodiments, a terminal receives the verification key and verification amount in connection with an identity verification procedure. In some embodiments, the terminal can be a client side terminal of a vendor performing the identity verification. For example, the terminal can be a terminal associated with a vendor that is also associated with the server. The verification key and verification amount can be input to an interface (e.g., a graphical user interface) provided by the terminal. For example, the terminal can include a touchscreen that displays a user interface via which the verification key and the verification amount are input to the terminal. In some embodiments, the terminal receives the verification key or verification amount over a wired or wireless connection. For example, the terminal can receive the verification key or verification amount from a user's mobile device via a wireless connection (e.g., Bluetooth, Near Field Communications (NFC), infrared, WiFi, or the like).

At 224, the verification key and the verification amount are sent to a server. In response to receiving the verification key and the verification amount (e.g., from the user), the terminal can send the verification key and verification amount to the server (e.g., for the server to validate the verification key and the verification amount).

At 226, a determination is made as to whether the verification key matches a stored key (also referred to herein as a preset key) and whether a verification amount matches a preset amount. In some embodiments, the server stores a mapping between preset keys, preset amounts, and users (e.g., user identifiers). The server can store preset keys and preset amounts in association with a user in connection with registration of a user with the server (e.g., a web-based service), or in connection with a transaction between the user and the server. In response to receiving the verification key and the verification amount from the terminal, the server can determine whether the verification key and the verification amount respectively match the preset key and the preset amount corresponding to the user according to the stored mappings between preset keys, preset amounts, and users. The server can provide the terminal with an indication whether the verification key matches the preset key and whether the verification amount matches the preset amount. The server can also provide the terminal with a general indication whether both the verification key and the verification amount match the preset key and the preset amount (e.g., without providing an indication of an individual matching result for the verification key and an individual matching result for the verification amount). In response to receiving the indication of whether the verification key matches the preset key and whether the verification amount matches the preset amount, the terminal can determine whether the verification key matches the preset key and whether the verification amount matches the preset amount. For example, the terminal can determine whether the verification key and the verification amount are validated according to a flag or other indication provided by the server.

In the event that the verification key is deemed to not match the stored preset key or the verification amount is deemed to not match the preset amount at 226, then at 228, an indication can be provided that indicates that the verification key does not match the stored preset key and/or the verification amount does not match the preset amount. The terminal can display the indication that indicates that the verification key does not match the stored preset key and/or the verification amount does not match the preset amount. Accordingly, the user can be deemed to fail the identity verification process.

In the event that the verification key and the verification amount are deemed to match the stored preset key and the verification amount at 226, then at 230, a determination can be made as to whether the key carrier is authenticated. The terminal can authenticate (e.g., verify) the key carrier corresponding to the verification key. For example, the server can determine whether the key carrier is valid or whether the key carrier includes the verification key received at 222. In some embodiments, the server completes identity verification by verifying whether the key carrier is true and valid. The key carrier can be authenticated in a similar manner to authentication of the key carrier at 125 of FIG. 1A.

In the event that the terminal determines that the key carrier is not authenticated at 230, then at 232, an indication can be provided that the key carrier is not authenticated. For example, the terminal can display an indication on a user interface that the key carrier is not authenticated. The identity verification process 220 can end in the event that the terminal determines that the key carrier is not authenticated.

In the event that the terminal determines that the key carrier is authenticated at 230, then at 234, an indication can be provided that the key carrier is authenticated. In some embodiments, in the event that the key carrier is authenticated, the terminal can provide an indication that the identity of the user is verified. In some embodiments, the terminal can send an indication that the identity of the user is verified to the server. In response to receiving the indication that the identity of the user is verified, the server can provide the user with access to a service. In some embodiments, the terminal can display the indication that the identity of the user is verified. In response, a vendor representative can provide the user with admission to a venue, a product for pick up by the user, or the like in connection with the identity verification procedure.

Figure 3:
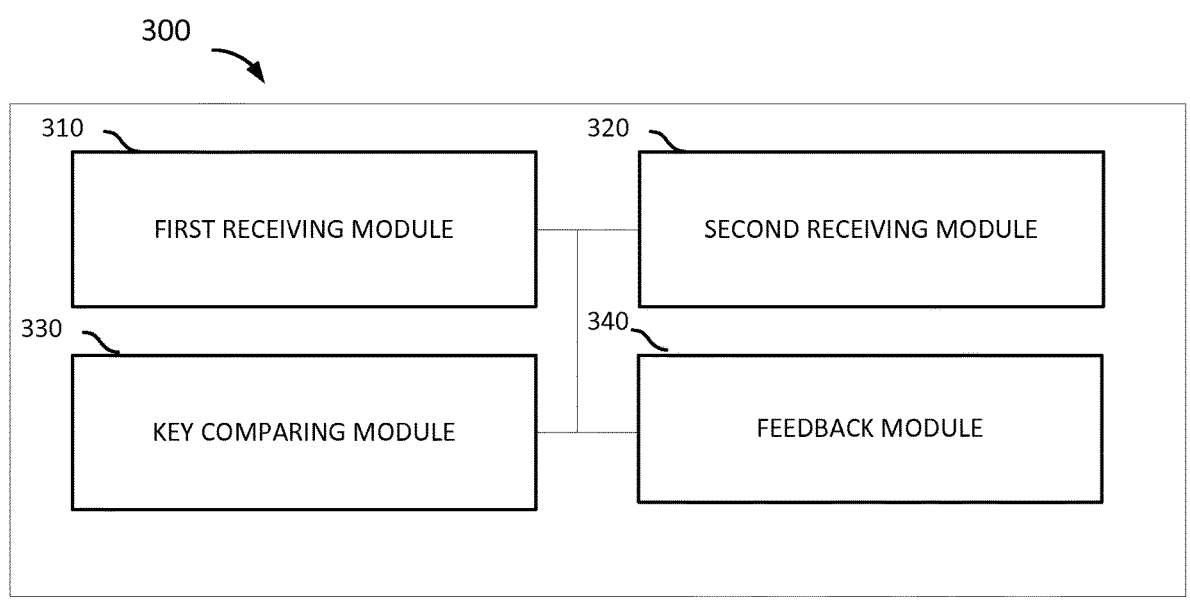
FIG. 3 is a structural diagram of a server for identity verification according to various embodiments of the present application.

FIG. 3 is a structural diagram of a server for identity verification according to various embodiments of the present application.

Referring to FIG. 3, a device 300 is provided. In some embodiments, the device 300 is a server. For example, the device 300 can implement process 100 of FIG. 1A or process 200 of FIG. 2A. The device 300 can be implemented by the system 800 of FIG. 8.

The device 300 can include a first receiving module 310, a second receiving module 320, a key comparing module 330, and a feedback module 340.

The first receiving module 310 is configured to receive and store a preset key. For example, the first receiving module 310 can receive a banknote serial number of some national currency input by a user. The first receiving module 310 can receive the preset key over a communication network. For example, the first receiving module 310 can receive the preset key from a terminal over a wired or wireless connection.

The second receiving module 320 can be configured to receive a verification key sent by a client (e.g., a terminal used by the user or vendor representative). The second receiving module 320 can receive the verification key in connection with an identity verification process. For example, the second receiving module 320 can receive the verification key from a terminal. In some embodiments, the terminal can be a client side terminal of a vendor performing the identity verification. For example, the terminal can be a terminal associated with a vendor that is also associated with the device 300. In some embodiments, the terminal can correspond to a user-owned terminal.

The key comparing module 330 is configured to compare the verification key with the preset key. The key comparing module 330 can retrieve a preset key corresponding to the user associated with the identity verification procedure. For example, the key comparing module 330 can retrieve the preset key according to a lookup of a mapping of preset keys to users stored in a local storage of the device 300 or a remote storage connected to the device 300. In the event that the preset key corresponds to a banknote serial number on a banknote, the key comparing module 330 can compare the verification key to the stored banknote serial number in order to determine whether the verification key matches the stored banknote serial number.

The feedback module 340 is configured to send the result of the comparison between the verification key and the preset key. In response to the key comparing module 330 comparing the verification key with the stored preset key, the feedback module 340 can send a result of the key comparison to the terminal.

The device 300 can also include a key carrier comparing module (not shown). The key carrier comparing module can invoke an authentication of the key carrier to be performed. The key carrier comparing module can cause programs or code to authenticate (e.g., verify) the key carrier corresponding to the verification key. For example, if the key carrier has communication capabilities, the key carrier module can determine whether the key carrier is valid or whether the key carrier includes the verification key received by the second receiving module 320 by invoking an authentication function and communicating with the key carrier directly using a preconfigured protocol. In some embodiments, the key carrier module causes another device (such as a bill detector device) to verify whether the key carrier is true and valid. The key carrier module can communicate with the other device to invoke the authentication of the key carrier and to receive a result of the authentication of the key carrier. In some embodiments, the result of the verification of the key carrier is communicated to the key carrier module to update records. In some embodiments, the key carrier module communicates an indication or prompt to a terminal to invoke an authentication of the key carrier and to receive a result of the authentication of the key carrier.

Figure 4:
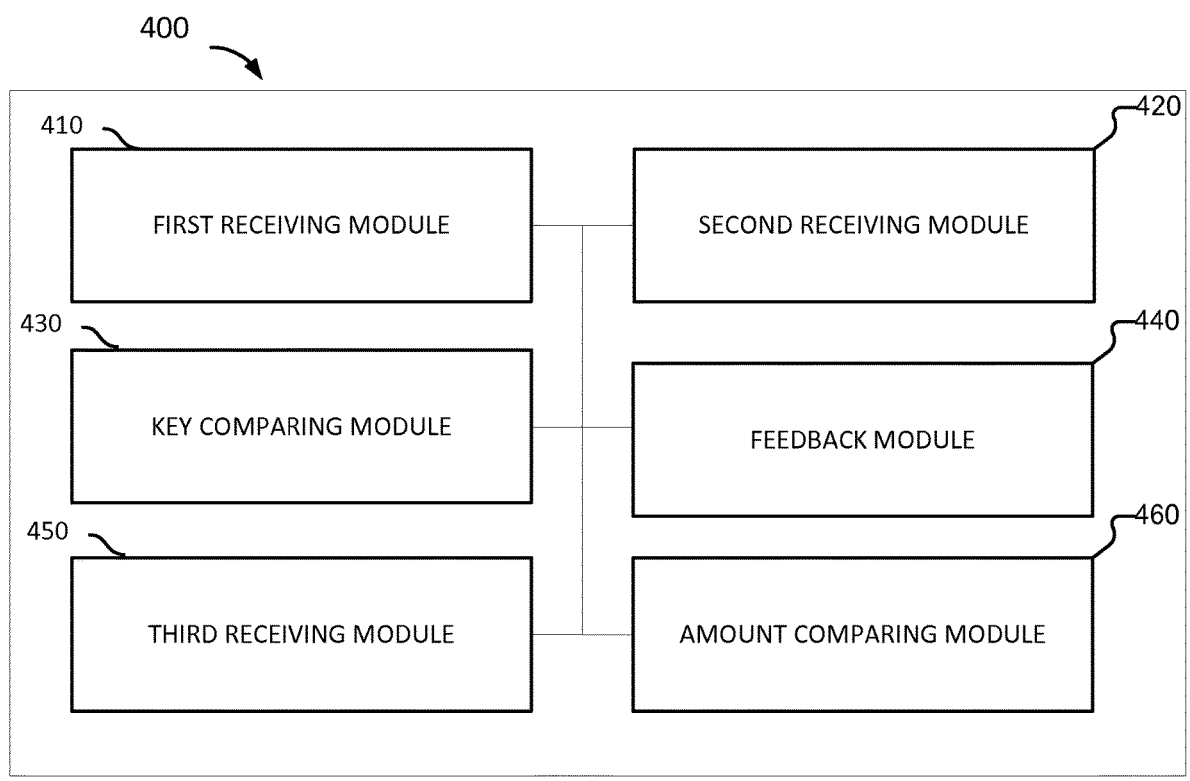
FIG. 4 is a structural diagram of a server for identity verification according to various embodiments of the present application.

FIG. 4 is a structural diagram of a server for identity verification according to various embodiments of the present application.

Referring to FIG. 4, a device 400 is provided. In some embodiments, the device 400 is a server. For example, the device 400 can implement process 100 of FIG. 1A or process 220 of FIG. 2A. The device 400 can be implemented by the system 800 of FIG. 8.

The device 400 includes a first receiving module 410, a second receiving module 420, a key comparing module 430, a feedback module 440, a third receiving module 450, and an amount comparing module 460.

The first receiving module 410 is configured to receive and store a preset key. For example, the first receiving module 410 can receive a banknote serial number of some national currency input by a user. The first receiving module 410 can receive the preset key over a communication network. For example, the first receiving module 410 can receive the preset key from a terminal over a wired or wireless connection.

The second receiving module 420 can be configured to receive a verification key sent by a client. The second receiving module 420 can receive the verification key in connection with an identity verification process. For example, the second receiving module 420 can receive the verification key from a terminal. In some embodiments, the terminal can be a client side terminal of a vendor performing the identity verification. For example, the terminal can be a terminal associated with a vendor that is also associated with the device 400. In some embodiments, the terminal can correspond to a user-owned terminal.

The key comparing module 430 is configured to compare the verification key with the preset key. The key comparing module 430 can retrieve a preset key corresponding to the user associated with the identity verification procedure. For example, the key comparing module 430 can retrieve the preset key according to a lookup of a mapping of preset keys to users stored in a local storage of the device 400 or a remote storage connected to the device 400. In the event that the preset key corresponds to a banknote serial number on a banknote, the key comparing module 430 can compare the verification key to the stored banknote serial number in order to determine whether the verification key matches the stored banknote serial number.

The feedback module 440 is configured to send the result of the comparison between the verification key and the preset key. In response to the key comparing module 430 comparing the verification key with the stored preset key, the feedback module 440 can send a result of the key comparison to the terminal.

The third receiving module 450 is configured to receive and store a preset amount. For example, the third receiving module 450 can receive a currency amount corresponding to a banknote serial number of some national currency input by a user that was received by the first receiving module 410. The third receiving module 450 can receive the preset amount over a communication network. For example, the third receiving module 450 can receive the preset key from a terminal over a wired or wireless connection.

The amount comparing module 460 is configured to receive a verification amount sent by the client (e.g., a terminal used by the user or a vendor representative). The amount comparing module 460 is further configured to compare the verification amount with the preset amount. The amount comparing module 460 can retrieve a preset amount corresponding to the user associated with the identity verification procedure. For example, the amount comparing module 460 can retrieve the preset amount according to a lookup of a mapping of preset amounts to users stored in a local storage of the device 400 or a remote storage connected to the device 400. In the event that the preset amount corresponds to a monetary number on a banknote, the amount comparing module 460 can compare the verification amount to the monetary amount stored by the third receiving module 450 and determine whether the verification amount matches the preset amount.

Accordingly, the feedback module 440 can be further configured to send the result of the comparison between the verification amount and the preset amount to the terminal (e.g., the client terminal used by the user or a vendor representative).

The device 400 can also include a key carrier comparing module (not shown). The key carrier comparing module can invoke an authentication of the key carrier to be performed. The key carrier comparing module can cause programs or code to authenticate (e.g., verify) the key carrier corresponding to the verification key. For example, if the key carrier has communication capabilities, the key carrier module can determine whether the key carrier is valid or whether the key carrier includes the verification key received by the second receiving module 420 by invoking an authentication function and communicating with the key carrier directly using a preconfigured protocol. In some embodiments, the key carrier module causes another device (such as a bill detector device) to verify whether the key carrier is true and valid. The key carrier module can communicate with the other device to invoke the authentication of the key carrier and to receive a result of the authentication of the key carrier. In some embodiments, the result of the verification of the key carrier is communicated to the key carrier module to update records. In some embodiments, the key carrier module communicates an indication or prompt to a terminal to invoke an authentication of the key carrier and to receive a result of the authentication of the key carrier.

Figure 5:
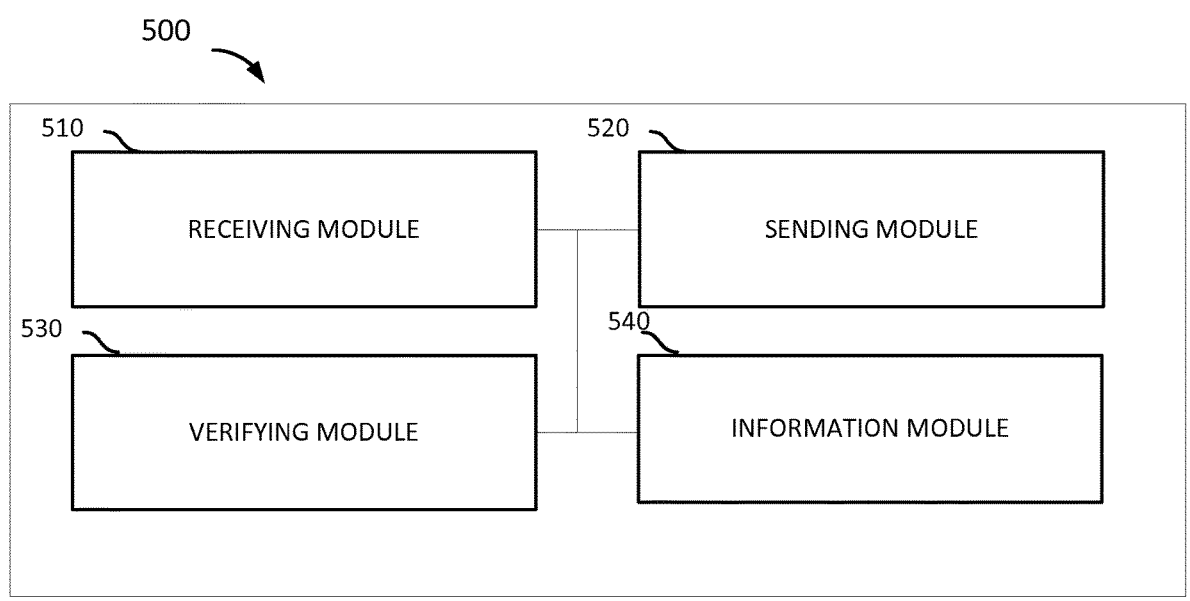
FIG. 5 is a structural diagram of a terminal for identity verification according to various embodiments of the present application.

FIG. 5 is a structural diagram of a terminal for identity verification according to various embodiments of the present application.

Referring to FIG. 5, a device 500 is provided. In some embodiments, the device 500 is a terminal (e.g., a client terminal). In some embodiments, the terminal can be a client side terminal of a vendor or the like performing the identity verification. For example, the terminal can be a terminal associated with a vendor that is also associated with the server. In some embodiments, the terminal can correspond to a user-owned terminal. As an example, the device 500 can implement process 150 of FIG. 1B or process 220 of FIG. 2B. The device 500 can be implemented by the system 800 of FIG. 8.

The device 500 can be used in connection with performing an identity verification of a user. The device 500 includes a receiving module 510, a sending module 220, a verifying module 530, and an information module 540.

The receiving module 510 is configured to receive a verification key from a user. For example, the receiving module 510 can receive the verification key via an input submitted to a user interface provided by the device 500. As another example, the receiving module 510 can receive the verification key from a user's mobile device via a wired or wireless connection. The receiving module 510 is further configured to receive a result of a comparison between the verification key and a preset key. The receiving module 510 can receive the result of the comparison from a server which performs the comparison.

The sending module 520 is configured to send the verification key received by the receiving module 510. In response to the receiving module 510, the sending module 520 is instructed (e.g., by a processor of the device 500) to send the verification key to the server.

The verifying module 530 is configured to verify a key carrier. For example, in response to the receiving module 510 receiving the result of the comparison between the verification key with the preset key indicating that the verification key matches the preset key, the verifying module 530 verifies the key carrier. The verifying module 530 verifies the key carrier by determining whether the key carrier is true and valid. The verifying module 530 can determine whether the key carrier is true and valid according to an input by a user or vendor representative associated with the service provided by the server.

The information module 540 is configured to issue the appropriate identity verification information. The information module 540 issues the appropriate identity verification information according to the verification result of the key verifying module 530 on whether said key carrier is true and valid. In some embodiments, the information module 540 issues according to a result of the comparison between the verification key and the preset key. For example, if the verification key does not match the preset key, the information module 540 can issue identity verification information indicating that the user identity is not verified.

Figure 6:
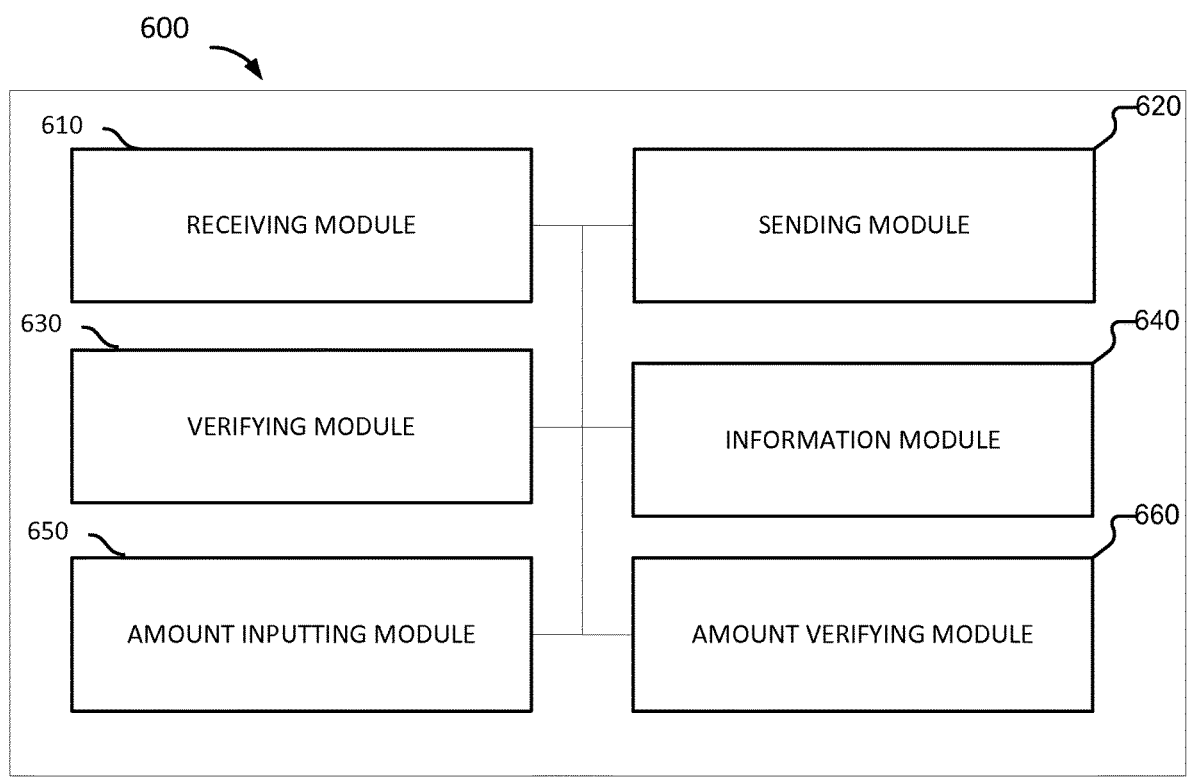
FIG. 6 is a structural diagram of a terminal for identity verification according to various embodiments of the present application.

FIG. 6 is a structural diagram of a terminal for identity verification according to various embodiments of the present application.

Referring to FIG. 6, a device 600 is provided. In some embodiments, the device 600 is a terminal (e.g., a client terminal). In some embodiments, the terminal can be a client side terminal of a vendor or the like performing the identity verification. For example, the terminal can be a terminal associated with a vendor that is also associated with the server. In some embodiments, the terminal can correspond to a user-owned terminal. As an example, the device 600 can implement process 150 of FIG. 1B or process 220 of FIG. 2B. The device 600 can be implemented by the system 800 of FIG. 8.

The device 600 can be used in connection with performing an identity verification of a user. The device 600 includes a receiving module 610, a sending module 620, a verifying module 630, an information module 640, an amount input module 650, and an amount verifying module 660.

The receiving module 610 is configured to receive a verification key from a user. For example, the receiving module 610 can receive the verification key via an input submitted to a user interface provided by the device 600. As another example, the receiving module 610 can receive the verification key from a user's mobile device via a wired or wireless connection. The receiving module 610 is further configured to receive a result of a comparison between the verification key and a preset key. The receiving module 610 can receive the result of the comparison from a server which performs the comparison.

The sending module 620 is configured to send the verification key received by the receiving module 610. In response to the receiving module 610, the sending module 620 is instructed (e.g., by a processor of the device 600) to send the verification key to the server.

The verifying module 630 is configured to verify a key carrier. For example, in response to the receiving module 610 receiving the result of the comparison between the verification key with the preset key indicating that the verification key matches the preset key, the verifying module 630 verifies the key carrier. The verifying module 630 verifies the key carrier by determining whether the key carrier is true and valid. The verifying module 630 can determine whether the key carrier is true and valid according to an input by a user or vendor representative associated with the service provided by the server.

In some embodiments, the verifying module 630 can invoke an authentication of the key carrier to be performed. The verifying module 630 can cause programs or code to authenticate (e.g., verify) the key carrier corresponding to the verification key. For example, if the key carrier has communication capabilities, the verifying module 630 can determine whether the key carrier is valid or whether the key carrier includes the verification key by invoking an authentication function and communicating with the key carrier directly using a preconfigured protocol. In some embodiments, the verifying module 630 causes another device (such as a bill detector device) to verify whether the key carrier is true and valid. The verifying module 630 can communicate with the other device to invoke the authentication of the key carrier and to receive a result of the authentication of the key carrier. In some embodiments, the result of the verification of the key carrier is communicated to the verifying module 630 to update records. In some embodiments, the verifying module 630 communicates an indication of whether the key carrier is authenticated to the server.

The information module 640 is configured to issue the appropriate identity verification information. The information module 640 issues the appropriate identity verification information according to the verification result of the key verifying module 630 on whether said key carrier is true and valid. In some embodiments, the information module 640 issues according to a result of the comparison between the verification key and the preset key. For example, if the verification key does not match the preset key, the information module 640 can issue identity verification information indicating that the user identity is not verified.

The amount inputting module 650 is configured to receive a verification amount input by a user. For example, the amount inputting module 650 can receive the verification key via an input submitted to a user interface provided by the device 600. The amount inputting module 650 is further configured to send the verification amount to a server in the event that the amount inputting module 650 receives the verification amount.

The amount verifying module 660 is configured to receive a result of a comparison between the verification amount and a preset amount. The amount verifying module 660 can receive the result of a comparison between the verification amount and a preset amount from a server. The amount verifying module 660 can be further configured to use the amount comparison result as a basis for determining whether the identity verification has been passed.

Figure 7:
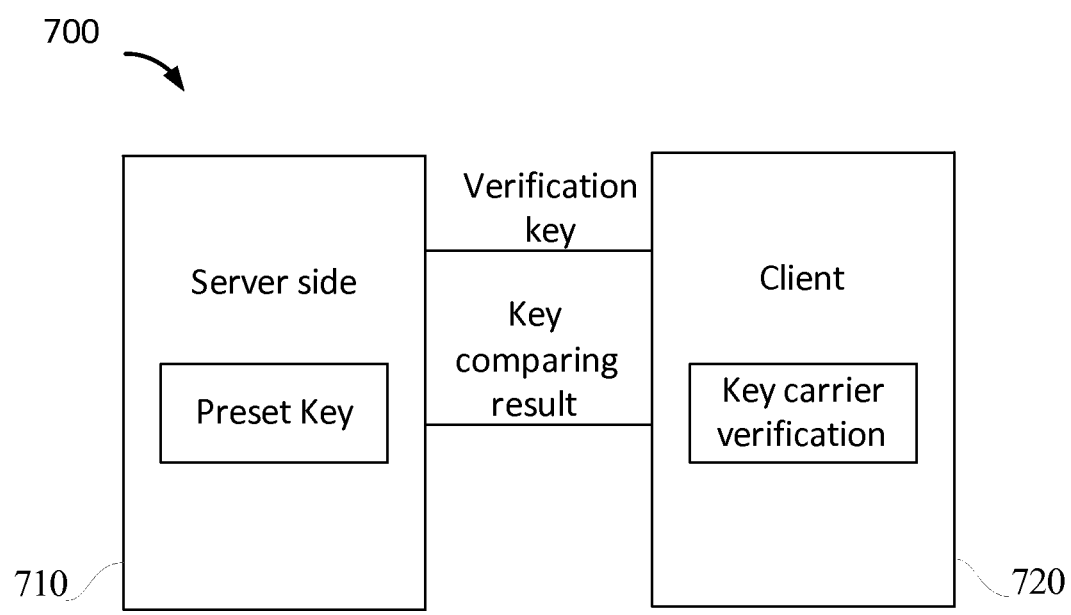
FIG. 7 is a structural diagram of a system for identity verification according to various embodiments of the present application.

FIG. 7 is a structural diagram of a system for identity verification according to various embodiments of the present application.

Referring to FIG. 7, a system 700 for providing identity verification is provided. The system 700 can implement process 100 of FIG. 1A, process 150 of FIG. 1B, process 200 of FIG. 2A, or process 220 of FIG. 2B. In some embodiments, system 700 implements device 300 of FIG. 3, device 400 of FIG. 4, device 500 of FIG. 5, or device 600 of FIG. 6.

The system 700 includes a server component 710 and a client side 720. In some embodiments, the server component 710 implements device 300 of FIG. 3 or device 400 of FIG. 4. In some embodiments, the client side 720 implements device 500 of FIG. 5 or device 600 of FIG. 6.

The server component 710 is configured to receive and store a preset key, to receive a verification key sent by the client, to compare the verification key with the stored preset key to determine whether the verification key matches the preset key, and to send the result of the comparison of the verification key to the preset key to the client side 720.

The client side 720 can be configured to receive the verification key and to send the verification key to the server component 710, to receive a result of the comparison of the verification key to the preset key from the server component 710, and in the event that the verification key matches the preset key, to verify the key carrier of the verification key, including verifying whether the key carrier is true and valid, and to complete identity verification by verifying whether the key carrier is true and valid.

In some embodiments, the preset key is a banknote serial number of some national currency. Correspondingly, the key carrier is the national currency, and the verifying of the key carrier includes determining whether the national currency is genuine or counterfeit.

According to various embodiments, a method, a client, a server component, and a system for verifying identities as provided by the present application add the determination of whether the verification key carrier is true and valid. Some embodiments can effectively solve the technical problem arising from sole reliance on a preset key to pass identity verification in cases according to which the preset key has been stolen by a malicious party. In particular, in some embodiments, the banknote serial numbers of currency are used as the preset keys. In some embodiments, when a key carrier is to be verified, only the genuineness of the currency is verified. Thus, the user does not need to provide the user's own personal information, such as a communication number or an email address. This effectively avoids the risk of personal information leaks from personal information provided in the identity verification process.

In some embodiments, the key carrier is not limited to a unique key carrier of the preset key. In some embodiments, the preset key may have multiple key carriers corresponding to the preset key. For example, the user can set the preset key at the server component as MM12345678. Corresponding to this preset key, there may be three true and valid key carriers M1, M2, and M3. During identity verification, all the key carriers M1, M2, and M3 can pass the client identity verification.

Figure 8:
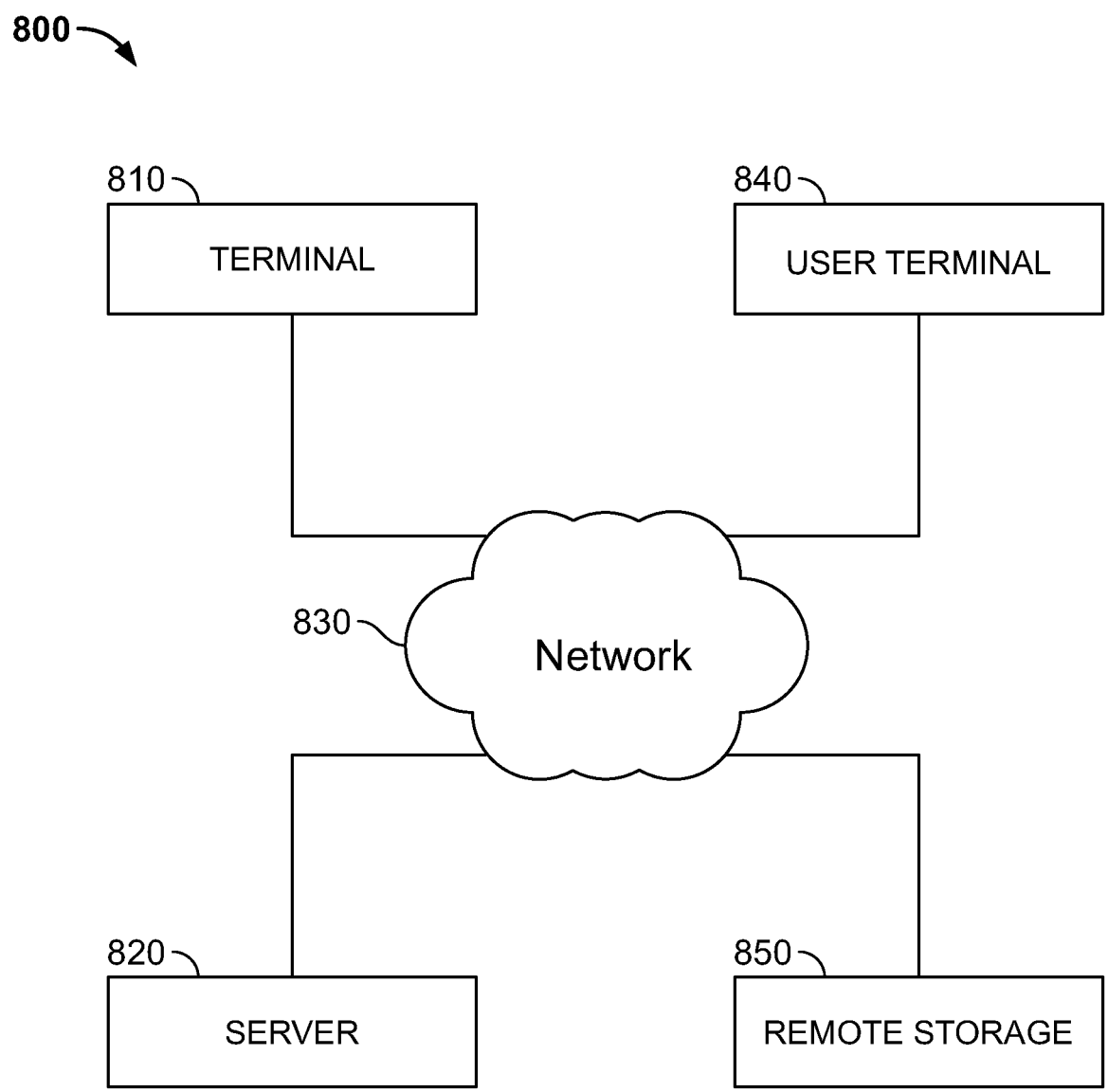
FIG. 8 is a structural diagram of a system for identity verification according to various embodiments of the present application.

FIG. 8 is a structural diagram of a system for identity verification according to various embodiments of the present application.

Referring to FIG. 8, a system 800 for providing identity verification is provided. The system 800 can implement process 100 of FIG. 1A, process 150 of FIG. 1B, process 200 of FIG. 2A, or process 220 of FIG. 2B. In some embodiments, system 800 implements device 300 of FIG. 3, device 400 of FIG. 4, device 500 of FIG. 5, or device 600 of FIG. 6.

The system 800 includes a terminal 810, a server 820, and a network 830. In some embodiments, the system 800 includes a user terminal 840 or a remote storage 850.

The terminal 810 receives a verification key in connection with an identity verification procedure. The terminal 810 can send the verification key to the server 820. For example, the terminal 810 can send the verification key to the server 820 over the network 830 (e.g., the Internet). The terminal 810 can send to the server 820 a user identifier associated with the verification key and associated with the user subject to the identity verification. The terminal 810 can send the user identifier to the server 820 in connection with the terminal 810 sending the verification key to the server 820.

In response to receiving the verification key, the server 820 retrieves a preset key associated with the user corresponding to the verification key. The server 820 can retrieve the preset key from a local storage or from a remote storage 850. The preset key can be stored in a database that stores mappings between preset keys and users (or preset keys, preset amounts, and users). If the server 820 is able to retrieve the preset key associated with the user, the server 820 compares the verification key to the preset key to determine whether the verification key matches the preset key. The server 820 can send a result of the comparison to the terminal 810.

In some embodiments, the server 820 receives the preset key from a user terminal 840 in connection with a registration of the user with the server 820 or a transaction between the user and the server 820 (e.g., a user using the user terminal 840 to purchase a good or service on a web-service hosted by, or otherwise associated with, the server 820).

Figure 9:
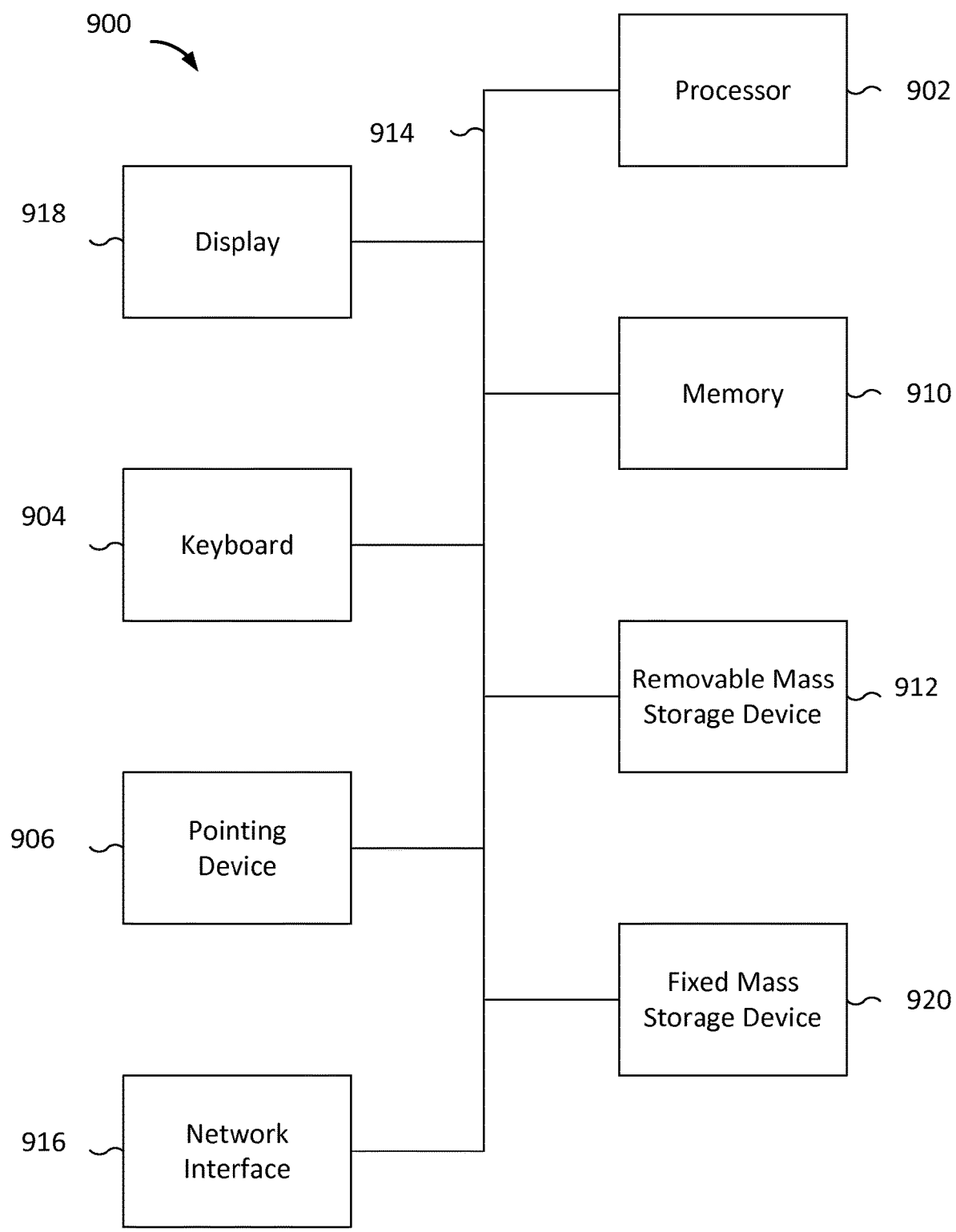
FIG. 9 is a functional diagram of a computer system for identity verification according to various embodiments of the present application.

FIG. 9 is a functional diagram of a computer system for identity verification according to various embodiments of the present application.

Referring to FIG. 9, a computer system 900 for processing call requests is provided. As will be apparent, other computer system architectures and configurations can be used to implement video calls. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown). The memory can be a non-transitory computer-readable storage medium.

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storage device 912 and fixed mass storage 920 generally store additional programming instructions, data, and the like that typically are not in active use by the processor 902. It will be appreciated that the information retained within mass storage device 912 and fixed mass storage 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although there was a description of protocols including HTTP or TCP/IP mentioned in the content above, the present application is not limited to situations where there must be full compliance with standard protocols including HTTP or TCP/IP. Slightly modified transmission mechanisms on the foundation of some protocols can also execute all the aforesaid embodiment schemes of the present application. Of course, even if a private protocol is used instead of the aforesaid HTTP or TCP/IP protocol, it still can realize the same invention, so long as it complies with the information exchange and information assessment and feedback modes of the various present application embodiments described above.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   registering a preset key that is defined by a first user, wherein:
   the preset key is printed on a side of a physical banknote that is in possession of the first user;
   the preset key is registered with one or more servers; and
   the registering the preset key comprises:
   receiving, by one or more servers, the preset key that is associated with the banknote, the preset key being received from a first device operated by the first user;
   determining whether the preset key exists in a database storing mappings between a plurality of preset keys and a plurality of users; and
   in response to determining the preset key does not exist in the database, storing, by the one or more servers, the preset key in the database storing mappings between a plurality of preset keys and a plurality of users, the preset key being associated with the first user; and authenticating the first user based at least in part on an authentication of the banknote and a determination of whether a verification key matches the preset key corresponding to the first user in the mappings between the plurality of preset keys and the plurality of users, the authenticating the first user comprising:
- receiving, by the one or more servers, the verification key in connection with an identity verification of the first user;
- retrieving, by the one or more servers, the preset key associated with the first user from the database;
- determining, by the one or more servers, whether the verification key matches the preset key associated with the first user;
- causing, by the one or more servers, a determination of whether the banknote is authentic, comprising:
  - obtaining an image of the banknote captured using a camera; and
  - causing a terminal to perform an image analysis on the image of the banknote and to determine whether the banknote is authentic based at least in part on the image analysis;
- receiving, by the one or more servers, an indication of whether the banknote is authentic, wherein:
  - the determination of whether the banknote is authentic is performed by the terminal or a second user of the terminal;
  - the indication of whether the banknote is authentic is communicated to the one or more servers by the terminal; and
  - the indication of whether the banknote is authentic is generated based at least in part on the image analysis with respect to the image of the banknote;
- in response to determining that the banknote is authentic based at least in part on the indication of whether the banknote is authentic, and to determining that the verification key matches the preset key, determining, by the one or more servers, that an identity of the first user is verified; and
- providing access to a service or causing the terminal to display an indication that the first user is authenticated.

2. The method of claim 1, wherein:
the preset key is a banknote serial number of the banknote; and
determining whether the banknote is authentic includes detecting whether the banknote is genuine.

3. The method of claim 2, further comprising:
receiving a preset amount associated with the banknote;
storing the preset amount;
receiving a verification amount in connection with the identity verification of the first user, comprising:
  causing the terminal to extract a monetary amount printed on the banknote based at least in part on the image analysis and to send the monetary amount printed on the banknote as the verification amount;
retrieving the preset amount associated with the first user; and
determining whether the verification amount matches the preset amount associated with the first user.

4. The method of claim 3, further comprising:
providing an indication of whether the verification amount matches the preset amount associated with the first user.

5. The method of claim 4, wherein the providing the indication of whether the verification key matches the preset key associated with the user includes providing an indication of whether the verification amount matches the preset amount associated with the first user.

6. The method of claim 3, wherein the preset amount corresponds to a monetary amount corresponding to the banknote.

7. The method of claim 1, further comprising:
receiving an indication of whether the identity of the first user is verified.

8. The method of claim 7, further comprising:
in response to a determination that the indication of whether the identity of the user is verified indicates that the identity of the first user is verified, providing access to a web-service to the first user.

9. The method of claim 1, wherein the first user is the same as the second user.

10. The method of claim 1, wherein the second user is associated with a vendor associated with a service for which the identity of the first user is being verified.

11. The method of claim 1, wherein:
the preset key is a banknote serial number of the banknote; and
the indication of whether the banknote is authentic is generated based at least in part on the image analysis determining whether the banknote includes a predefined watermark.

12. The method of claim 11, wherein the performing the image analysis includes using an ultraviolet or magnetic detection technology in connection with determining whether the banknote is authentic.

13. The method of claim 1, wherein:
the causing the determination of whether the banknote is authentic is performed in response to determining that the verification key matches the preset key associated with the first user; and
the causing the determination of whether the banknote is invoked in response to executing code on the server.

14. A method, comprising:
authenticating a first user based at least in part on a physical banknote and a determination of whether a verification key matches a preset key corresponding to the first user in the mappings between the plurality of preset keys and the plurality of users, the authenticating the first user comprising;
  receiving, by one or more processors, the verification key included on the banknote, wherein:
    the preset key is printed on a side of the banknote;
    the banknote is in possession of the user; and
    the first user defines, with respect to a system comprising at least a server, the preset key;
  sending, by the one or more processors, the verification key to the server;
  receiving, by the one or more processors, an indication whether the verification key matches the preset key associated with the first user, wherein the indication of whether the key matches the preset key associated with the first user is based at least in part on a mapping of between a plurality of preset keys and a plurality of users, and wherein the preset key is associated with the first user in response to the server determining that the mapping of between a plurality of preset keys and a plurality of users did not include in an entry for a user different from the first user the preset key associated with the first user at a time that the preset key is stored in association with the first user; and in response to receiving the indication that the verification key matches the preset key associated with the first user, invoking, by the one or more processors, a determination of whether the banknote associated with the verification key is authentic and completing identity verification according to whether the banknote is valid, comprising:

obtaining an image of the banknote captured using a camera;

causing a terminal to perform an image analysis on the image of the banknote and to determine whether the banknote is authentic based at least in part on the image analysis;

providing, to the server, an indication of whether the banknote is authentic, wherein:

the determination of whether the banknote is authentic is performed by the terminal or a second user of the terminal;

the server determines that an identity of the first user is verified in response to determining that the banknote is authentic based at least in part on the indication of whether the banknote is authentic, and to determining that the verification key matches the preset key; and the indication of whether the key is authentic is communicated to the server by the one or more processors; and the indication of whether the banknote is authentic is generated based at least in part on the image analysis with respect to the image of the banknote.

15. The method of claim 14, wherein:
the preset key is a banknote serial number of the banknote;
determining whether the banknote is authentic includes detecting whether the banknote is genuine.

16. The method of claim 14, further comprising:
receiving a verification amount associated with the banknote, comprising:
causing the terminal to extract a monetary amount printed on the banknote based at least in part on the image analysis and to send the monetary amount printed on the banknote as the verification amount;
sending the verification amount to the server; and
receiving an indication whether the verification amount matches a preset amount associated with the first user.

17. The method of claim 16, further comprising:
using the indication whether the verification amount matches the preset amount associated with the user as a basis for determining whether the identity of the first user is verified.

18. A device, comprising:
at least one processor configured to:
register a preset key that is defined by a first user, wherein:
the preset key is printed on a side of a physical banknote that is in possession of the first user;
the preset key is registered with one or more servers; and
to register the preset key comprises:
receive the preset key that is associated with the banknote, the preset key being received from a first device operated by the first user;
determine whether the preset key exists in a database storing mappings between a plurality of preset keys and a plurality of users; and
in response to a determination that the preset key does not exist in the database, store the preset key in the database storing mappings between a plurality of preset keys and a plurality of users, the preset key being associated with the first user; and
authenticate the first user based at least in part on an authentication of the banknote and a determination of whether a verification key matches the preset key corresponding to the first user in the mappings between the plurality of preset keys and the plurality of users, to authenticate the first user comprising:
receive the verification key in connection with an identity verification of the first user;
retrieve the preset key associated with the first user from the database;
determine whether the verification key matches the preset key associated with the first user;
cause a determination of whether the banknote is authentic, comprising:
obtaining an image of the banknote captured using a camera; and
causing a terminal to perform an image analysis on the image of the banknote and to determine whether the banknote is authentic based at least in part on the image analysis;
receive, by the one or more servers, an indication of whether the banknote is authentic, wherein:
the determination of whether the banknote is authentic is performed by the terminal or a second user of the terminal;
the indication of whether the banknote is authentic is communicated to the one or more servers by the terminal; and
the indication of whether the banknote is authentic is generated based at least in part on the image analysis with respect to the image of the banknote;
in response to determining that the banknote is authentic based at least in part on the indication of whether the banknote is authentic, and to determining that the verification key matches the preset key, determine that an identity of the first user is verified; and
provide access to a service or cause the terminal to display an indication that the first user is authenticated; and
a memory coupled to the at least one processor and configured to provide the at least one processor with instructions.

19. The device of claim 18, wherein:
the preset key is a banknote serial number of the banknote; and
determining whether the banknote is authentic includes detecting whether the banknote is genuine.

20. The device of claim 19, wherein the at least one processor is further configured to:
receive a preset amount associated with the banknote;
store the preset amount;
receive, from a terminal, a verification amount in connection with the identity verification of the first user, comprising:
causing the terminal to extract a monetary amount printed on the banknote based at least in part on the image analysis and to send the monetary amount printed on the banknote as the verification amount;
retrieve the preset amount associated with the user; and
determine whether the verification amount matches the preset amount associated with the user.

21. The device of claim 20, wherein the at least one processor is further configured to:
provide an indication of whether the verification amount matches the preset amount associated with the first user.

22. The device of claim 20, wherein the preset amount corresponds to a monetary amount corresponding to the banknote.

23. The device of claim 18, wherein the at least one processor is further configured to:
receive an indication of whether the identity of the first user is verified.

24. The device of claim 23, wherein the at least one processor is further configured to:
in response to a determination that the indication of whether the identity of the user is verified indicates that the identity of the user is verified, provide access to a web-service to the user.

25. A system, comprising:
at least one processor configured to:
authenticate a first user based at least in part on a physical banknote and a determination of whether a verification key matches a preset key corresponding to the first user in the mappings between the plurality of preset keys and the plurality of users, to authenticate the first user comprising:
receive the verification key included on the banknote, wherein:
the preset key is printed on a side of the banknote;
the banknote is in possession of the user; and
the first user defines, with respect to a server, the preset key;
send the verification key to the server;
receive an indication whether the verification key matches the preset key associated with the first user, wherein the indication of whether the key matches the preset key associated with the first user is based at least in part on a mapping of between a plurality of preset keys and a plurality of users, and wherein the preset key is associated with the first user in response to the server determining that the mapping of between a plurality of preset keys and a plurality of users did not include in an entry for a user different from the first user the preset key associated with the first user at a time that the preset key is stored in association with the first user; and
in response to receiving the indication that the verification key matches the preset key associated with the first user, invoke a determination of whether the banknote associated with the verification key is authentic and complete identity verification according to whether the banknote is valid, comprising:
obtaining an image of the banknote captured using a camera;
causing a terminal to perform an image analysis on the image of the banknote and to determine whether the banknote is authentic based at least in part on the image analysis;
providing, to the server, an indication of whether the banknote is authentic, wherein:
the determination of whether the banknote is authentic is performed by the terminal or a second user of the terminal;
the server determines that an identity of the first user is verified in response to determining that the banknote is authentic based at least in part on the indication of whether the banknote is authentic, and to determining that the verification key matches the preset key;
the indication of whether the key is authentic is communicated to the server by the one or more processors; and
the indication of whether the banknote is authentic is generated based at least in part on the image analysis with respect to the image of the banknote; and
a memory coupled to the at least one processor and configured to provide the at least one processor with instructions.

26. The system of claim 25, wherein:
the preset key is a banknote serial number of the banknote; and
determining whether the banknote is authentic includes detecting whether the banknote is genuine.

27. The system of claim 25, wherein the at least one processor is further configured to:
receive a verification amount associated with the banknote, comprising:
causing the terminal to extract a monetary amount printed on the banknote based at least in part on the image analysis and to send the monetary amount printed on the banknote as the verification amount;
send the verification amount to the server; and
receive an indication whether the verification amount matches a preset amount associated with the first user.

28. The system of claim 27, wherein the at least one processor is further configured to:
use the indication whether the verification amount matches the preset amount associated with the first user as a basis for determining whether the identity of the first user is verified.

29. A computer program product, the computer program product being embodied in a non-transitory computer readable storage medium and comprising computer instructions for:
registering a preset key that is defined by a first user, wherein:
the preset key is printed on a side of a physical banknote that is in possession of the first user;
the preset key is registered with one or more servers; and
the registering the preset key comprises:
receiving, by one or more processors, processors, the preset key that is associated with the banknote, the preset key being received from a first device operated by the first user;
determining whether the preset key exists in a database storing mappings between a plurality of preset keys and a plurality of users; and
in response to determining the preset key does not exist in the database, storing, by the one or more processors, the preset key in the database storing mappings between preset keys and users, the preset key being associated with the first user; and
authenticating the first user based at least in part on an authentication the banknote and a determination of whether a verification key matches the preset key corresponding to the first user in the mappings between the plurality of preset keys and the plurality of users, the authenticating the first user comprising:

receiving, from a terminal, the verification key in connection with an identity verification of the first user;

retrieving, by the one or more processors, the preset key associated with the user from the database;

determining, by the one or more processors, whether the verification key matches the preset key associated with the user;

causing, by the one or more processors, a determination of whether the banknote is authentic, comprising:

obtaining an image of the banknote captured using a camera; and causing the terminal to perform an image analysis on the image of the banknote and to determine whether the banknote is authentic based at least in part on the image analysis;

receiving, by the one or more servers, an indication of whether the banknote is authentic, wherein:

the determination of whether the banknote is authentic is performed by the terminal or a second user of the terminal;

the indication of whether the banknote is authentic is communicated to the one or more servers by the terminal; and the indication of whether the banknote is authentic is generated based at least in part on the image analysis with respect to the image of the banknote;

in response to determining that the banknote is authentic based at least in part on the indication of whether the banknote is authentic, and to determining that the verification key matches the preset key, determining, by the one or more servers, that an identity of the first user is verified; and providing access to a service or causing the terminal to display an indication that the first user is authenticated.

* * * * *